(12) United States Patent
Thompson

(10) Patent No.: US 11,676,038 B2
(45) Date of Patent: Jun. 13, 2023

(54) SYSTEMS AND METHODS FOR MULTI-OBJECTIVE OPTIMIZATIONS WITH OBJECTIVE SPACE MAPPING

(71) Applicant: THE AEROSPACE CORPORATION, El Segundo, CA (US)

(72) Inventor: Timothy Guy Thompson, Purcellville, VA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 652 days.

(21) Appl. No.: 15/267,528

(22) Filed: Sep. 16, 2016

(65) Prior Publication Data

US 2018/0082209 A1 Mar. 22, 2018

(51) Int. Cl.
*G06N 3/126* (2023.01)

(52) U.S. Cl.
CPC .................... *G06N 3/126* (2013.01)

(58) Field of Classification Search
CPC ....... G06N 99/005; G06N 3/126; G06N 5/003
See application file for complete search history.

(56) References Cited

U.S. PATENT DOCUMENTS

| 5,222,192 A * | 6/1993 | Shaefer ................ G06Q 10/04 706/13 |
| 5,255,345 A * | 10/1993 | Shaefer ................ G06Q 10/04 706/13 |
| 5,319,781 A | 6/1994 | Syswerda |
| 5,568,500 A | 10/1996 | Furuya et al. |
| 6,532,076 B1 | 3/2003 | Sidorowich |

(Continued)

FOREIGN PATENT DOCUMENTS

WO  WO2010132804 A1  11/2010

OTHER PUBLICATIONS

Kukkonen et al., "Ranking-Dominance and Many-Objective Optimization," pp. 3983-3990 (IEEE 2007) (Year: 2007).*

(Continued)

*Primary Examiner* — Kakali Chaki
*Assistant Examiner* — Kevin L. Smith
(74) *Attorney, Agent, or Firm* — Lee & Hayes, P.C.

(57) ABSTRACT

Systems and methods are provided for operating to an initial optimized baseline solution to a multi-objective problem. As the initial optimized baseline solution is determined, some regions, such as local or global maxima, minima, and/or saddle points in the objective space may be mapped. The mapping may be performed by storing mesh chromosomes corresponding to some of the features (e.g., extrema, saddle points, etc.) in the objective space along with the location of those chromosomes within the objective space (e.g., objective values corresponding to each of the objectives). The mesh chromosome may be used in subsequent re-optimization problems, such as with reformulation. Although in a re-optimization the objectives, decision variables, and or objective/constraint models may change, the mesh chromosomes may still provide information and direction for more quickly and/or with reduced resources converge on a re-optimized solution.

20 Claims, 9 Drawing Sheets

(56) References Cited

U.S. PATENT DOCUMENTS

| | | | |
|---|---|---|---|
| 6,651,046 B1* | 11/2003 | Sato | G06Q 99/00 706/13 |
| 6,662,167 B1 | 12/2003 | Xiao | |
| 6,941,287 B1 | 9/2005 | Vaidyanathan et al. | |
| 7,835,929 B2 | 11/2010 | Bennett | |
| 7,996,344 B1 | 8/2011 | Goel | |
| 8,069,127 B2 | 11/2011 | Taylor et al. | |
| 8,255,344 B2 | 8/2012 | Ferringer et al. | |
| 8,255,345 B2 | 8/2012 | Ferringer et al. | |
| 8,285,653 B2 | 10/2012 | Ferringer et al. | |
| 8,433,662 B2 | 4/2013 | Ferringer et al. | |
| 8,494,988 B2 | 7/2013 | Ferringer et al. | |
| 8,498,952 B2 | 7/2013 | Ferringer et al. | |
| 8,504,496 B2 | 8/2013 | Ferringer et al. | |
| 8,560,472 B2 | 10/2013 | Ferringer et al. | |
| 8,862,627 B2 | 10/2014 | Ferringer et al. | |
| 9,189,733 B2 | 11/2015 | Thompson et al. | |
| 9,321,544 B2 | 4/2016 | Thompson et al. | |
| 2002/0013776 A1 | 1/2002 | Kishi | |
| 2002/0120407 A1* | 8/2002 | Stevens | G06N 3/126 702/20 |
| 2005/0187846 A1 | 8/2005 | Subbu et al. | |
| 2005/0256684 A1* | 11/2005 | Jin | G06N 3/126 703/2 |
| 2007/0005522 A1 | 1/2007 | Wren | |
| 2008/0010044 A1 | 1/2008 | Ruetsch | |
| 2008/0094250 A1 | 4/2008 | Myr | |
| 2008/0215512 A1 | 9/2008 | Narzisi et al. | |
| 2008/0234944 A1 | 9/2008 | Schaffer et al. | |
| 2008/0241839 A1 | 10/2008 | Potkin et al. | |
| 2009/0313191 A1 | 12/2009 | Yao et al. | |
| 2010/0040281 A1* | 2/2010 | Chen | G06K 9/6229 382/156 |
| 2010/0046806 A1 | 2/2010 | Baughman et al. | |
| 2010/0292929 A1 | 11/2010 | Ferringer et al. | |
| 2010/0293120 A1 | 11/2010 | Ferringer et al. | |
| 2010/0293122 A1 | 11/2010 | Ferringer et al. | |
| 2010/0293313 A1 | 11/2010 | Ferringer et al. | |
| 2011/0078100 A1 | 3/2011 | Goel | |
| 2011/0231320 A1 | 9/2011 | Irving | |
| 2011/0276527 A1 | 11/2011 | Pitcher et al. | |
| 2012/0029965 A1 | 2/2012 | Steffen et al. | |
| 2012/0063590 A1 | 3/2012 | Dortschy et al. | |
| 2012/0084314 A1 | 4/2012 | Ferringer et al. | |
| 2013/0024395 A1 | 1/2013 | Clark et al. | |
| 2013/0054045 A1 | 2/2013 | Ramezani et al. | |
| 2013/0132042 A1 | 5/2013 | Chan | |
| 2013/0218526 A1* | 8/2013 | Lev | G06F 17/50 703/1 |
| 2014/0039689 A1* | 2/2014 | Honda | G05B 15/02 700/276 |
| 2014/0278695 A1 | 9/2014 | Smith et al. | |
| 2015/0019173 A1* | 1/2015 | Amid | G06F 30/00 703/1 |
| 2015/0161629 A1 | 6/2015 | Verma | |
| 2015/0170051 A1* | 6/2015 | Bufe, III | G06N 3/126 706/13 |
| 2017/0011292 A1 | 1/2017 | Thompson | |
| 2017/0068890 A1 | 3/2017 | Thompson | |
| 2017/0169353 A1 | 6/2017 | Thompson et al. | |
| 2017/0293839 A1 | 10/2017 | Thompson et al. | |
| 2017/0364812 A1 | 12/2017 | Thompson et al. | |
| 2018/0082198 A1 | 3/2018 | Thompson et al. | |

OTHER PUBLICATIONS

Patel et al., "Fast Mesh-Sorting in Multi-objective Optimization," pp. 936-941 (Int'l Federation of Automatic Control, 2015) (Year: 2015).*

Zuzana Vitingerová, "Evolutionary Algorithms for Multi-Objective Parameter Estimation," Czech Technical University in Prague (Dissertation 2010) (Year: 2010).*

Zitzler et al., "ATutorial on Evolutionary Multiobjective Optimization," Springer (2004) (Year: 2004).*

Brockhoff et al., "Tutorial on Evolutionary Multiobjective Optimization," GECCO (2015) (Year: 2015).*

Office Action for U.S. Appl. No. 14/963,870, dated Oct. 3, 2018, Thompson et al, "Systems and Methods for Multi-Objective Evolutionary Algorithms with Soft Constraints", 28 pages.

Office Action for U.S. Appl. No. 15/094,521, dated Nov. 29, 2018, Thompson et al, "Systems and Methods for Multi-Objective Heuristics with Conditional Genes", 26 pages.

Abraham, Andrew, "Particle Swarm Optimization of Low-Thrust, Geocentric-to-Halo-Orbit Transfers," May 2014, Thesis and Dissertation, Lehigh University, 202 pages.

Anonymous, <http://www.apptimation.com/Technology/Technology.html>, https://web.archive.org/web/20100701034104/http://www.apptimation.com/Technology/Technology.html, captured Jul. 1, 2010, 1 page.

Barker, Allison, "Aerospace Competes in International Global Trajectory Optimization Competition." Orbiter. vol. 48, No. 3. Mar. 27, 2008, 1 page.

Benedict et al., "Scheduling of Scientific Workflows Using Niched Pareto GA for Grids"; 2006, IEEE pp. 908-912.

Cantu-Paz, et al.; "Efficient parallel genetic algorithms: theory and practice." 2000; Comput. Methods Appl. Meeh. Engrg. 186 (2000) pp. 221-238; Elsevier Science S.A.

Chuang, et al.; "An Extensible Genetic Algorithm Framework for Problem Solving in a Common Environment"; 2000 IEEE; Transactions on Power Systems, vol. 15, No. 1; pp. 269-275.

Deb et al., "A Fast and Elitist Multi-Objective Genetic Algorithm: NSGA-11" Sep. 2000, KanGAL Report No. 200001. 20 pages.

Deb et al., "Evaluating the epsilon-Domination Based Multi-Objective Evolutionary Algorithm for a Quick Computation of Pareto-Optimal Solutions." 2005, Evolutionary Computation (13)4: 501-525.

Deb et al.; "Omni-Optimizer: A generic evolutionary algorithm for single and multi-objective optimization"; 2006 Elsevier; European Journal of Operational Research 185 (2008); pp. 1062-1087.

Erickson et al.; Multi-objective Optimal Design of Groundwater Remediation Systems: Application of the Niced Pareto Genetic Algorithm (NPGA); Advances in Water Resources 25 (2002); pp. 51-65.

Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

Ferringer et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer et al., "Pareto-hypervolumes for the Reconfiguration of Satellite Constellations." AIAA/AAS Aslrodynamics Specialist Conference and Exhibit. Aug. 18-21, 2008, p. 1-31.

Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Hadka et al., "Borg: An Auto-Adaptive Many-Objective Evolutionary Computing Framework," 2013. Evolutionary Computation, 21(2): 231-259.

Horn et al.; "A Niched Pareto Genetic Algorithm for Multiobjective Optimization" 1994; IEEE; pp. 82-87.

Search Report and Written Opinion for International Application No. PCT/US2010/034955 dated Aug. 17, 2010.

Kollat et al., "A Computational Scaling Analysis of Multiobjective Evolutionary Algorithms in Long-Term Groundwater Monitoring Applications." Advances in Water Resources. Jan. 25, 2006. 1-24.

Kollat et al., "A Framework for Visually Interactive Decision-making and Design using Evolutionary Multi-objective Optimization (Video)" Environmental Modelling & Software 22. 2007, 1691-1704.

Kollat et al., "A New Epsilon-Dominance Hierarchical Bayesian Optimization Algorithm for Large Multiobjective Monitoring Network Design Problems" Advances in Water Resources 31. 2008, 828-845.

(56) References Cited

OTHER PUBLICATIONS

Kollat et al., "Comparing state-of-the-art evolutionary multi-objective algorithms for long-term groundwater monitoring design." Advances in Water Resources 29 (2006): 792-807. <www.elsevier.com/locate/advwatres>.
Kollat et al., "The Value of Online Adaptive Search: A Performance Comparison of NSGAII, epsilon-NSGAII and epsilonMOEA." Springer-Verlag Berlin Heidelberg 2005. 386-398.
Laumanns et al.; "Combining Convergence and Diversity in Evolutionary Multi-Objective Optimization"; 2002; Massachusetts Institiute of Technology; Evolutionary Computation 10(3); pp. 1-21.
Lorenz, Edward, "Predictability: A Problem Partly Solved," 1996, In Proc. Seminar on Predictability, vol. 1, No. 1, 18 pages.
Mackey et al, "Oscillation and Chaos in Physiological Control Systems," Jul. 15, 2977, Science. 197(4300): 287-289.
Muhlenbein et al.; "Evolution in time and space—the parallel genetic algorithm."; 1991; Morgan Kaufmann; pp. 1-22.
Office Action for U.S. Appl. No. 13/837,782, dated Jan. 15, 2015, Smith et al., "Systems and Methods for Prioritizing Funding of Projects", 21 pages.
Office Action for U.S. Appl. No. 13/837,782, dated Oct. 20, 2016, Smith et al., "Systems and Methods for Prioritizing Funding of Projects", 16 pages.
Office Action for U.S. Appl. No. 13/837,782, dated Mar. 30, 2017, Smith et al., "Systems and Methods for Prioritizing Funding of Projects", 20 pages.
Office Action for U.S. Appl. No. 13/837,782, dated Apr. 7, 2016, Smith et al., "Systems and Methods for Prioritizing Funding of Projects", 14 pages.
Office action for U.S. Appl. No. 14/796,299, dated Jun. 19, 2018, Thompson, "Systems and Methods for Multi-Objective Evolutionary Algorithms with Category Discovery", 22 pages.
Office action for U.S. Appl. No. 14/847,424, dated Jun. 28, 2018, Thompson, "Systems and Methods for Multi-Objective Optimizations with Live Updates", 24 pages.
Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.
Srinivas et al., "Multiobjective Optimization Using Nondominated Sorting in Genetic Algorithms," 1994. Evolutionary Computation, 2(3): 221-248.
Stodgell et al., "Satellite Rendezvous Tours Using Multiobjective Evolutionary Optimization."Astrodynamics 2007: Advances in teh Astronautical Sciences, vol. 129, Part III, Proceedings of the AAS/AIAA Astrodynamics Specialist Conference, Aug. 19-23, 2007, Mackinac Island, Michigan, pp. 2069-2094, 28 pages.
Subbu, et. al., "Management of Complex Dynamic Systems based on Model-Predictive Mutli-objective Optimization", IEEE International Conference on Computational Intelligence for Measurement Systems and Applications, Jul. 2006, pages.
Tan et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.
Tang et al., "Parallelization Strategies for Rapid and Robust Evolutionary Multiobjective Optimization in Water Resources Applications." Advances in Water Resources. 2006, 1-39.
Van Veldhuizen et al., "Considerations in Engineering Parallel Multiobjective Evolutionary Algorithms." IEEE Transactions on Evolutionary Computation. vol. 7, No. 2, Apr. 2003. 144-173.
Van Veldhuizen et al., "(Final Draft) TR-98-03 Multiobjective Evolutionary Algorithm Research: A History and Analysis" Oct. 14, 1998; pp. 1-30.
Ventura et al.; "JCLEC: a Java framework for evolutionary computation"; 2007; Springer-Verlag; pp. 381-392.
Zimmer et al., "Utilizing Evolutionary Algorithms for Problems with Vast Infeasible Regions and Expensive Function Evaluations." The Aerospace Corporation. Jun. 27, 2008, 12 pages.
Chootinan et al, "Constraint Handling in Genetic Algorithms Using a Gradient-Based Repair Method," Mar. 14, 2005, Computers & Operations Research, 33: 2263-2281.
Dauphin et al, "Identifying and Attacking the Saddle Point Problem in High-Diminesional Non-Convex Optimization," 2014, In Advances in Neural Information Processing Systems, vol. 27, 9 pages.
Farmani et al, "Self-Adaptive Fitness Formulation for Constrained Optimization", Oct. 2003, IEEE Transactions on Evolutionary Computation, 7(5):445-455.
Ishibuchi et al, "A Multi-Objective Genetic Local Search Algorithm and Its Application to Flowshop Scheduling," Aug. 1998, IEEE Transactions on Systems, Man, and Cybernetics—Part C: Applications and Reviews, 28(3): 392-403.
Office Action for U.S. Appl. No. 14/796,299 dated Jan. 23, 2019, Thompson et al., "Systems and Methods for Multi-Objective Evolutionary Algorithms with Category Discovery," 15 pages.
Office Action for U.S. Appl. No. 15/268,840 dated Apr. 26, 2019 , Thompson et al., "Systems and Methods for Multi-Objective Optimizations with Decision Variable Perturbations", 23 pages.
Office Action for U.S. Appl. No. 14/847,424, dated Apr. 19, 2019, Timothy Guy Thompson, "Systems and Methods for Multi-Objective Optimizations with Live Updates", 19 pages.
Sorensen, "Route stability in vehicle routing decisions: a bi-objective approach using metaheuristics", Central European Journal of Operations Research, 2006, pp. 193-207.
Ferringer, Matthew P. "General Framework for the Reconfiguration of Satellite Constellations." Aug. 1, 2009, Dissertation, The Pennsylvania State University, Department of Aerospace Engineering, 254 pages.
Tang, Yong, "Advancing Hydrologic Model Evaluation and Identification Using Multiobjective Calibration Sensitivity Analysis and Parallel Computation." 2007, Thesis in Civil Engineering, The Pennsylvania State University. 225 pages.
Non Final Office Action dated Feb. 18, 2020 for U.S. Appl. No. 15/184,577 "Progressive Objective Addition in Multi-objective Heuristic Systems and Methods" Thompson, 43 pages.
Taillard, et al., "POPMUSIC—Partial Optimization Metaheuristic Under Special Intesification Conditions", Essays and Surveys in Metaheuristics, Springer, Boston, MA 2002, pp. 613-629.
U.S. Office Action dated Jun. 22, 2020 for U.S. Appl. No. 15/184,577 "Progressive Objective Addition in Multi-objective Heuristic Systems and Methods" Thompson, 14 pages.

* cited by examiner

SYSTEMS AND METHODS FOR MULTI-OBJECTIVE OPTIMIZATIONS WITH OBJECTIVE SPACE MAPPING

FIELD OF THE DISCLOSURE

Aspects of the disclosure are related generally to multi-objective optimizations, and more particularly to systems and methods for objective space mapping.

BACKGROUND OF THE DISCLOSURE

Large-scale value-based non-linear models often require large numbers of decision variables and constraints (e.g., over a million). Heuristic systems, such as Multi-objective Evolutionary Algorithms (MOEA), may be particularly useful in optimizing problems with large number of interdependent variables. Often times in these MOEA, the initially determined optimization may need to be refined using a new set of objectives, decision variable, and/or base conditions. It may often be costly (e.g., computer resource intensive) to re-optimize using a reformulated optimization problem, such as with non-stationary models.

BRIEF DESCRIPTION OF THE DRAWINGS

Reference will now be made to the accompanying drawings, which are not necessarily drawn to scale, and wherein.

DETAILED DESCRIPTION

Figure 1:
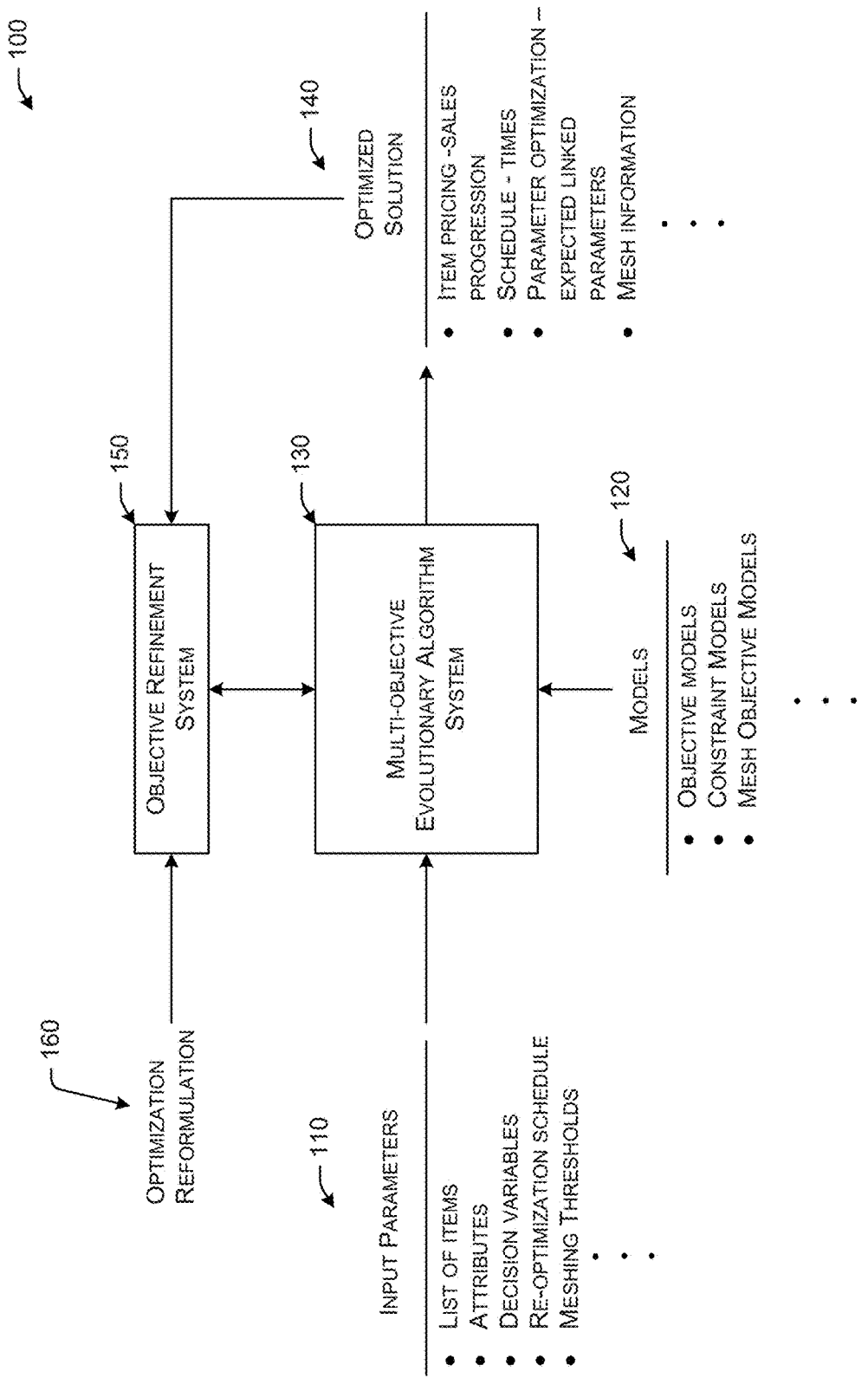
FIG. 1 is a schematic diagram that illustrates an example optimizing system with input parameters and optimized solutions based on one or more objective models and/or constraint models of a multi-objective evolutionary algorithm (MOEA) system with an objective refinement system, in accordance with example embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure may include a multi-objective optimization system having a multi-objective evolutionary algorithms (MOEAs) system, along with an objective refinement system. Evolutionary algorithms have been described in a variety of other publications including commonly owned U.S. Pat. No. 8,494,988, issued Jul. 23, 2013, filed on Aug. 31, 2009 and titled "Systems and Methods for Generating Feasible Solutions form Two Parents for an Evolutionary Process," the contents of which, in its entirety, is incorporated herein by reference.

In example embodiments, an initial multi-objective optimization may be performed by the MOEA system, prior to implementation of the optimized solution. Such an initial optimization may be performed for any suitable variety of applications. Such an initial optimization may be performed to optimize any suitable variety of objectives. An optimized solution may be one where the solution is non-dominated relative to other potential solutions. A non-dominated solution may be a solution where the solution performs no worse than another solution, when evaluated according to all of the objectives for that particular optimization, while performing better than all other solutions according to at least one of the objectives. When an initial multi-objective optimization is generated, the stakeholder (e.g., the entity requesting/using the optimization) may attempt to implement the optimized initial optimization.

In example embodiments, the MOEA system may further be configured to generate a mapping of the objective space. In such a mapping, relatively interesting regions within the objective space (e.g., a multi-dimensional space where the dimensions are the multiple objectives of an optimization problem) may be mapped in a manner such that a mesh of the objective space may be determined and stored in a mesh archive. The mesh or mapping may include a number of topographical features in the objective space, such as local peaks, local valleys, saddle points, regions of relatively high gradients, etc. The mesh, as generated by the MOEA system, may be stored in a mesh archive or an objective space mapping datastore. In example embodiments, the mesh archive may include an indication of one or more mesh chromosomes (e.g., data arrays of decision variables of the multi-objective optimization problem) along with the location in the objective space (e.g., objective values corresponding to a mesh chromosome) of the mesh chromosome. Storing of the mesh chromosomes may provide a hint of regions of interest in the objective space, if a re-optimization is to be repeated and/or reformulated.

In example embodiments, a mesh may include a set of chromosomes that define the boundaries of a feature in the objective space. In example embodiments, a mesh-archive may include a set of meshes that define boundaries of a set of currently known features. A mesh-archive-history may include a collection of mesh-archives giving a sequence of previously best known features. Epsilon cells may be used to smooth out the otherwise jagged definition of objective space features and to thin the number and complexity of the discovered meshes.

In example embodiments, features may be discerned by comparison with neighboring points (e.g., points sufficiently close to each other). An optimization may have points that it compares, such as in the current pareto-archive and child population. This archive and child population may be migrating through the objective space. The features may have a specific address in the objective space at any given time, notwithstanding drift resulting from non-stationary aspects of the objective and constraint models. The systems and methods disclosed herein are configured to map these fixed features in the objective space as the optimization is navigating through the objective space and visiting points (e.g., individual chromosomes). A feature may be captured by being outlined by a mesh, in accordance with example embodiments. In some example embodiments of the disclosure, a mesh that delineates the feature may be determined as feature boundaries are discovered and/or explored in a non-contiguous and/or non-continuous sequence.

There may be mapping between the decision variable space (e.g., gene space) into the objective space, and as the multi-objective optimization proceeds, an evolving set of non-dominated solutions may converge to a pareto-front. The objective space, may have a variety of features, such as multi-modal features, local minima, ridges and valleys, and any other variety of features which contain information (e.g., mapping tendencies between decision variable and objective spaces). For example, gradient search techniques may leverage this information in order to navigate and MOEA techniques may use this information to discover building blocks. Note that in MOEA optimization, these features are generally observed only while passing through that point in objective space, and most visited points are discarded on the way to the converged non-dominated set of solutions. According to embodiments of the disclosure, interesting points on the path to a non-dominated set of solutions may be archived as a mesh and/or mesh archive for use in later optimization problems to relatively more quickly drive to a solution.

A reformulation of a multi-objective optimization problem may include a change in any one or more of objectives, decision variables, boundary conditions, objective models, and/or constraint models relative to an initial baseline formulation. In some example embodiments, such a reformulation may be performed in response to detecting an irregular operation (IROP), such as a detection of IROP based at least in part on an operator declaring an IROP and/or based on comparisons of live data (e.g., real time or near real time data) to expectations of that data. For example, the MOEA system may provide an expected time progression of one or more metrics associated with the initial optimization. In some cases, the one or more metrics may include one or more of the decision variables that were optimized in the initial optimization. In the same or other cases, the one or more metrics may include one or more of the expected objective values of the initial optimization. In yet further overlapping or exclusive example cases, the one or more metrics may include factors that may be derived from one or more of the decision variables and/or one or more of the expected objective values. These expected time progressions of one or more metrics may be compared to live data and if a divergence between the expectations of the one or more metrics from the live data is observed beyond a threshold condition, an IROP may be declared by an operator and/or an IROP system. In some cases, when an IROP condition results in a re-optimization, a reduced set of decision variables and/or a reduced set of objectives may be used in the re-optimization problem.

In further example embodiments, a reformulation of a multi-objective optimization may be performed if base conditions of an optimization problem changes over time. For example, if the objective and/or constraint models are non-stationary, then the formulation of a particular multi-objective optimization problem may change over time. Thus in a newly formulated multi-objective optimization problems, one or more of the objective models and/or constraint models may be refined (e.g., to be more accurate and/or precise). In yet further example embodiments, a re-optimization may be performed if there is a re-assessment of priorities by an entity (e.g., a stake holder) performing and/or commissioning the optimization. In still further example embodiments, reformulation and refinement of multi-objective optimizations may be driven by steering event that are performed for the purposes of solving optimization problems with a relatively large number of objectives. Such problems may be solved with a series of connected optimizations, where learning from a previous partial-optimization may be used in a subsequent partial-optimization.

Regardless of the reasons for performing a re-optimization, it will be appreciated that in a reformulated optimization problem at least one of objectives, decision variables, boundary conditions, objective models, and/or constraint models may be modified relative to an initial baseline optimized solution. It will further be appreciated that in a reformulated problem, information and learning from the previous multi-objective optimization may be used to more efficiently drive to a new optimized solution in the reformulated optimization problem. In example embodiments, a meshing, mapping, and/or outline of the objective space, or portions thereof, from an initial optimization problem may provide valuable information to a subsequent reformulated optimization problem. For example, even if an objective space has been perturbed and/or the mapping thereof to a decision variable space has been perturbed by changing one or more of objectives, decision variables, boundary conditions, objective models, and/or constraint models in a reformulated problem, the initial optimization may provide enough information about features and profiles of the objective space that may still be relevant to the new objective space of the reformulated multi-objective problem. Accordingly, a mesh and/or outline of the initial optimization problem may be used as a starting point and/or a guide to directing solutions, including, for example, injecting new chromosomes in a population and/or performing directed mutations of chromosomes when performing subsequent reformulated optimization(s) related to an initial multi-objective optimization.

In example embodiments, when the heuristic system (e.g., MOEA system) performs the initial multi-objective optimization, a meshing of the objective space may be determined and stored in a meshing archive for subsequent use if a reformulated optimization(s) are to be performed. This meshing archive, in example embodiments, may be in addition to an archive that stores non-dominated chromosome solutions. The meshing archive may store one or more meshing chromosomes along with the point in the objective space that corresponds to the meshing chromosome. In some example embodiments, the meshing chromosomes may be selected from spots in the objective space that may give a hint of potential chromosomes to evaluate in a reformulated optimization problem. A collection of these meshing chromosomes may form a mesh. A collection of these meshes (e.g., each mesh having its collection of meshing chromosomes) may be stored as a mesh archive. In some example embodiments, a chromosome from an initial optimization may be mapped to a chromosome in a reformulated optimization problem. For example, a reformulated problem may have a reduced set of decision variables. Thus a mapping from the initial optimization's decision variable space to the reformulated optimization's decision variable space may entail removing the decision variables from the original decision variable space that do not exist anymore in the new reformulated decision variable space. In the same or different example embodiments, there may be a mapping between the objective space of an initial optimization and that of a reformulated optimization objective space. In this case, the reformulated objective space may have the same or different (e.g., same total number of different total number) objectives. A meshing chromosome in the original objective space may be compared to the corresponding chromosome and its objective values in the reformulated objective space to provide an indication of perturbations between the initial objective space and the reformulated objective space. It will be appreciated that the mappings in the decision variable space and/or objective space may be used for the purposes of quickly converging to an optimized solution in the reformulated re-optimization.

In some example embodiments, the MOEA system may continuously and/or periodically be performing re-optimizations and the objective refinement system may be configured to formulate the re-optimization for the MOEA system on a regular and/or periodic basis. The MOEA system may utilize the mesh archive, as generated from an initial and/or previous optimization, to perform the re-optimization. In some cases, this may entail formulating one or more starting chromosomes to be used in the reformulated optimization based at least in part on the mesh chromosomes stored in the mesh archive. In the same or further cases, driving the re-optimization may further include using the topography of the objective space of prior optimizations to navigate the decision variable space of the current optimization. In this way, a re-optimization may be performed faster and/or with reduced resources (e.g., processing power, number of cores, supercomputer time, etc.).

The MOEA system may be configured to identify one or more mesh chromosomes during any particular multi-objective optimization and store that mesh chromosome along with its location in objective space. The mesh chromosomes may, in some example embodiments, be dominated with respect to the optimization problem. In other words, the mesh chromosomes may not represent global extrema in the objective space, in example cases, but rather may represent local extrema and/or saddle points in the objective space. In example embodiments, the mesh chromosomes may be non-dominated in one generation of the optimization, but may be subsequently dominated, as the optimization continues. Thus, a mesh non-dominated sorting may be performed to identify mesh chromosomes that are to be culled and included in a mesh. Mesh objectives (e.g., different from the optimization objectives) may be used for the purposes of identifying appropriate mesh chromosomes. In still further example embodiments, the mesh chromosomes may be determined by identifying zero-crossings (e.g., relative to one or more objectives of the objective space), change in slope, diminishing step-wise gradients, etc. In some example embodiments, meshing objectives may be utilized to identify the mesh chromosomes, or otherwise chromosomes that should be retained as representative of informative regions of an objective space that may be revisited during a re-optimization. Such a meshing objective may relate to an aggregate slope across multiple dimensions (e.g., objectives) of the objective space.

In some example embodiments, the initial optimization may be driven in a manner to map out portions of the objective space, such as to find suspected topographical features in the objective space (e.g., hypervolumetric/hyper-dimensional objective space). Such a mapping may not necessarily drive to a non-dominated solution in the initial optimization, but may provide information for any reformulation that may be performed after the initial optimization.

According to example embodiments of the disclosure, mesh-non-domination sorting may be performed by analyzing a chromosome and a mesh, for each objective to determine if a feature is inside or outside of the mesh, if there is a zero crossing (e.g., tangent with zero slope), and/or if there is a change of slope direction. According to this example embodiment, a particular chromosome is inside of a mesh, then the given chromosome is mesh-dominated. Furthermore, if a zero-crossing is detected, then the particular chromosome is not a member of the mesh and is mesh-non-dominated. Further still, if the particular chromosome has the same slope direction, then it is an extender of the mesh boundaries and it mesh-dominates at least one other member of the mesh.

It will be appreciated that the multi-objective problem may be any suitable multi-objective problem and the systems and methods, as described herein, may be applied to any suitable subsequent re-optimization. In example embodiments, the methods and systems, as described herein, may be suited for solving, tracking, re-optimizing, and/or re-deploying pricing optimization problems. In other example embodiments, the methods and systems, as described herein, may be suited for scheduling problems. In other example embodiments, the methods and systems, as described herein, may be suited for multi-parameter optimization. Indeed, in other example embodiments, the optimization problem to which the methods and systems described herein may be applied may be a combination of various elements, such as pricing, timing, or any other suitable parameter input.

In one non-limiting example, the initial optimization may be for a schedule of flights, times, and routes within a network of an airline. In this case, the stakeholder may be the airline and the multiple objectives may be any variety of general or industry specific considerations, such as profitability, fuel consumption, ground time, load factor, equipment non-utilization time, customer satisfaction metrics, on-time departures, lost bags, on-time arrivals, accumulated delays, combinations thereof, or the like. While performing the initial optimization, one or more mesh chromosomes may be stored in a mesh archive along with their location within the objective space. When the airline receives an initial optimization, such as from the MOEA system, the airline may attempt to implement that initial optimization throughout their flight network. This may include attempting to implement and/or control such factors as departure times, fueling points of equipment, allocation of equipment to routes, ground time, equipment/route mapping to arrival and/or departure gates, equipment mapping to airports, idle equipment allocations and/or movement, back-up equipment allocation to airports, equipment to location inventory, combinations thereof, or the like.

Once the airline implements the initial optimization, there may be a need to reformulate the optimization problem and re-optimize. For example, it may be determined that live data does not match within a predetermined threshold with predicted metrics for the initial optimization. This may be, for example, due to bad weather related delays at a hub airport of the airline. A reformulated re-optimization may be performed for the airline network. Such a re-optimization may include a reduced set of decision variable. For example, departure times and/or arrival times of flights that have already flown may not be considered in the re-optimization. Alternatively and/or additionally, the re-optimization may use a different set of objectives and/or priorities of those objectives. For example, an initial set of objectives may include optimization of factors such as revenue and/or profitability. However, if a weather delay is encountered, other objectives, such as minimizing delays and/or maximizing customer satisfaction metrics may be given relatively more weight than financial objectives in a reformulated optimization. In a reformulated optimization, the mesh chromosomes, as generated and stored during the initial optimization may be used to start and/or drive the reformulated re-optimization.

It will be appreciated that the systems and methods, as described herein, may be configured, in example embodiments, for any variety of suitable optimization problems, including the aforementioned scheduling problems. For example, scheduling problems may include optimizing the scheduling of various services associated with transportation, delivery courier, logistics, just-in-time manufacturing, combinations thereof, or the like. In such problems, items such as delivery times, arrival delays, non-deployed time, maintenance time, consumable usage, maintenance, revenues, costs, profits, return on capital (ROC), return on investments (ROI), combinations thereof, or the like may be optimized. Indeed, it will be appreciated that any type of scheduling problem may be applied to the systems and methods, as described herein. In example embodiments, these types of problems may be prone to a variety of weather, emergency, and/or asset/infrastructure impairment related irregular operations. In some example embodiments, the systems and methods, as described herein, may be particularly suited for solving relatively highly-constrained multi-objective scheduling optimization problems. In example embodiments, the systems and methods, as described herein, may be used for re-solving a multi-objective scheduling optimization problems relatively quickly by using topological (e.g., mesh) knowledge gathered from a previous optimization process.

In another non-limiting example, the systems and methods, as described herein, may be applied to pricing problems, such as optimizing the pricing of various hotel rooms that may be available to a hotel or chain of hotels. The pricing may be optimized within the constraints of offering the hotel rooms for rental. In this example, each of the various types of rooms (queen bed/facing the beach, two double beds/facing the pool, etc.) may be represented as separate prices for rental. The prices of the hotel rooms may be determined based at least in part on expected demand of the hotel rooms at various rental prices. The initial optimization may provide a price for each room of a hotel chain for each rental day at some predetermined time in the future. These optimized variables may be provided and implemented, such as by offering the rooms for sale at the optimized prices, by the hotel chain operator. In addition to the pricing of rooms offered for sale across the network of the hotel chain (e.g., pricing by location, season, room type, room size, view, amenities, packages, etc.), the MOEA may provide an expected progression of sales as a function of the time until the rental date arrives. The MOEA may also provide continuous updates to the initial optimization. In some example embodiments, these continuous updates may use a different and/or reduced set of decision variables compared to the initial optimization and/or a different and/or reduced set of objectives compared to the initial optimization. In example embodiments, the systems and methods, as described herein, may be used for implementing these continuous updates of a multi-objective pricing problem relatively quickly by using topological (e.g., mesh) knowledge gathered from a previous optimization process.

It will be appreciated that the systems and methods, as described herein, may be configured, in example embodiments, for any variety of suitable optimization problems, including the aforementioned pricing optimization problems. For example, pricing problems may include optimizing the price of different types of hotel rooms for a hotel chain, different type of seats of various flights for an airline, different type of insurance products targeted to various insurance clients for an insurance company, different types of client services targeted to various investors of an investment firm, product pricing of various models and trims of cars manufactured and sold by car companies, or the like. Indeed, it will be appreciated that any type of pricing problem may be applied to the systems and methods, as described herein. In such pricing problems, items such as non-deployed time, cancelations, vacancies, overbooking, consumable usage, maintenance, revenues, costs, profits, return on capital (ROC), return on investments (ROI), combinations thereof, or the like may be optimized.

In another non-limiting example, a semiconductor manufacturer may optimize a product mix for a particular factory to maximize a variety financial objectives, such as revenue, profits, ROI, ROC, etc. The MOEA system may provide an optimized mix of products (e.g., wafer starts per week) of various products, by considering the aforementioned multiple objectives, that may be manufactured in the factory and predict yield and revenue from each of the products. If conditions assumed for the optimization change, then a reformulated re-optimization may be performed. For example, such a re-optimization may be performed if product yields do not match expectations, if one or more equipment are impaired unexpectedly, if product prices have changed, if one or more products have become obsolete, or the like. A re-formulated optimization may make use of mesh data generated in an initial optimization to relatively more quickly converge on an optimized solution.

In other manufacturing based examples, a variety of factory-based manufacturing parameters of various manufacturing equipment may be optimized for any variety of objectives, such as manufacturing yield and/or manufacturing throughput, etc. In example embodiments, the systems and methods, as described herein, may be particularly suited for performing re-optimizations based at least in part on mappings of the objective space from previous optimizations.

In example embodiments, a mesh-archive may be the current best set of meshes, and a mesh-archive-history may include a sequence of previous mesh-archives used during change detection to discern feature drifting of non-stationary models (e.g., models where the objective models and/or other conditions change with time) caused by live data feeds and steering. Thus, when the model is non-stationary, unchanged decision variables in the model may compute different objectives values and constraints, as other factors and states of the model cause non-stationary behavior in the output. This is what may happen with the live data feeds with re-optimization due to irregular operations (IROP), such as with ticket pricing problems. This non-stationary output may be viewed as a drifting of the objective space features, like changes in the terrain. This shifting may be detected through a change analysis of the current mesh-archive and the mesh-archive-history. As the mesh-archive drifts during problem reformulations and non-stationary noise, a sequence of mesh-archives may be analyzed to detect trends and patterns in the drifting which could be used for predictions.

FIG. 1 is a schematic diagram that illustrates an optimizing system 100 with input parameters 110 and optimized solutions 140 based on one or more models 120 for a multi-objective evolutionary algorithm (MOEA) system 130 with an objective refinement system 150, in accordance with example embodiments of the disclosure. While a particular configuration of the optimizing system 100 is depicted herein, it will be appreciated that the configuration may vary depending on particular application of the MOEA system 130, according to various embodiments of the disclosure. Indeed, there may be any variety of input parameters 110, models 120, MOEA system 130, objective refinement system 150, and/or optimized solutions 140.

The input parameters 110 may be any suitable set of parameters, including, in example embodiments, a listing of decision variables, such as decision variables and attributes of those decision variables. Decision variables may be the elements that may be thought of as arranged as genes in a chromosome (e.g., data elements in an array). The decision variables may be the elements that are optimized during a multi-objective optimization as performed by the MOEA system 130. These multi-objective optimizations may generate an optimized solution that may be implemented as a baseline implementation of a particular entity (e.g., airline network, factory, hotel chain operator, etc.). For example, in the context of pricing hotel rooms, as discussed above, decision variables may include the price of each of the various types of rooms, where the types of the rooms may be described by the attributes of the decision variables. The attributes may include any variety of descriptors and/or parameters associated with a corresponding decision variables. These descriptors may be any variety of naming of the item or any type of parameters that may indicate any quality or naming of the items. For example, in reference to the previous example of the hotel rooms, the attributes may include descriptors of a particular element (e.g., type of hotel room). Such descriptors may include, for example, location, single occupancy, double occupancy, beach facing, garden facing, high floor, handicap access, suite, twin beds, king bed, combinations thereof, or the like. It will be appreciated that attributes may further serve as a mechanism to tag, name or otherwise refer to a particular decision variable among more than one (e.g., many) decision variable.

In some example embodiments where the MOEA system 130 may be performing continuous and/or periodic re-optimization with a reformulated problem, parameters for performing these re-optimizations may be provided as part of the input parameters 110. For example, the optimization stopping criteria may be different than the stopping criteria for the re-optimization. Also, the re-optimizations may be performed continuously or periodically with a predefined periodicity, so there may be a re-optimization schedule. Furthermore, a different set of decision variables and/or objectives may be used in the re-optimization. Therefore, any or some of these factors and parameters may be predefined and provided to the MOEA system 130 as part of the input 110. In other example embodiments, the re-optimization parameters may be provided by the objective refinement system 150. In some cases, the optimization reformulation 160 may include changes to the objectives, changes to the decision variables, changes to the objective models, and/or changes to the constraint models. In some example embodiments, the optimization reformulation may be received from a stake holder that initiates the re-optimization by the MOEA system 130. In some cases, the input parameters 110 may further include meshing thresholds. Meshing thresholds may be rules (e.g., slope change identification rules, gradient evaluation rules, etc.) by which mesh chromosomes may be identified during an optimization problem.

The models 120 may include objective model(s), constraint model(s), and/or mesh objective models that may be used by the MOEA system 130 for evaluating solutions according to the multiple objectives, determining constraints of solutions (e.g., infeasible solutions), and/or identifying meshing chromosomes, respectively. The objective models may provide value(s) for any variety of objectives that may be optimized. For example, with pricing optimization problems, the objective model(s) may be used to evaluate potential solutions for objective performance such as total profit, total revenue, customer dissatisfaction metrics, probability of outselling the product, combinations thereof, or the like. The constraint models may provide value(s) for any variety of constraints that may be navigated in the constraint optimization mechanism. For example, with pricing optimization problems, the objective model(s) may be used to evaluate the total number of sales of a particular item at a particular price point.

As shown, the result of optimization based on the input parameters 110 and by using the models 120, outputs 140 may be generated by the MOEA system 130. The outputs 140 may be one or more variables that are optimized in accordance with the models 120 by the MOEA system 130. For example, in a pricing optimization problem, the outputs may be an indication of a price or range of prices of various products (e.g., hotel rooms, airline flights, insurance products, investment products, types of mobile electronic devices, etc.) that do not violate any constraints, or at least minimizes constraint violations, while providing an optimized solution on the basis of the one or more objective functions.

As a non-limiting example, the results or output of a pricing optimization problem applied to hotel rooms may result in a king bed/beach facing room priced at $299 per night, a twin bed/beach facing room at $249 per night, a king bed/courtyard facing room at $199 per night, and a twin bed/garden facing room at $179 per night. This is by way of example only and it will be appreciated that, in example embodiments, there may be more than four elements to be priced. For example, a world-wide hotel chain may wish to price its rental rooms across all of its worldwide properties. In such an example, constraints may arise from the hotel chain, at least in the short run, having a fixed number of hotel rooms. As another example, an airline may wish to price all flights that it has on its network (e.g., 2000 daily sorties), including multi-leg flights. In such an example, constraints may arise from the airline, at least in the short run, having a fixed number of available seats for each seating class between any two cities. As yet another example, a consumer electronics company may wish to price its entire range of notebook computers, table computers, and smartphones with various trims and options. In such an example, constraints may arise from the consumer electronics company, at least in the short run, having a fixed manufacturing capacity across its line of products in shared manufacturing assets (e.g., factories).

In example embodiments, when outputs 140 or multi-objective optimized solutions are discussed, the objective values may be pareto-optimized. In this case, no single objective may be optimized at the cost of other of the multi-objectives. Instead, in example embodiments, the optimization front (e.g., in a multiple objective space) may be optimized as far as possible. When potential solutions are evaluated by the MOEA system 130, a non-domination test may be performed to identify solutions that may be used for generation of subsequent populations of solutions (e.g., child populations generated by crossover, selection, and/or mutation). In some example embodiments, non-dominated solutions, or otherwise solutions that are better than any previous solution with regards to at least one objective and no worse with regards to all objectives, may be propagated for child solutions.

In example embodiments, the output 140 may also include a variety of derivative outputs associated with the collection of pareto-optimized solutions or a single optimized solution. These derivative outputs may be an expected progression of metrics associated with an optimized solution. For example, the optimized solution may be for pricing of airline tickets (e.g., decision variables) and the derivative output (e.g., expected metrics) may be of the percentage of seats sold as a function of days till the flight. Thus, this derivative output of an expected metric may be used to identify an IROP condition.

In some example embodiments, the optimized solutions may include mesh information. The mesh information may be stored in a mesh archive. The mesh archive may have a plurality of mesh chromosomes stored therein. Each of the mesh chromosomes may be stored along with their location in the objective space. In other words, the coordinate of a particular mesh chromosome may be specified within the objective space by indicating the value corresponding to each of the objectives for that mesh chromosome. These mesh chromosomes, along with their locations in the objective space may be stored in the mesh archive, where that information may be accessed if and/or when a re-optimization is commissioned.

The objective refinement system 150, in example embodiments, may be configured to receive the outputs 140 and/or other information from the MOEA system 130. The objective refinement system 150 may further be configured to receive one or more live data, such as real-time or near real-time data of the operations of the optimized entity from one or more systems configured to provide the live data (e.g., monitoring systems, logging systems, sensor(s), sensor systems, etc.). The objective refinement system 150 may be configured to compare the live data, as received to the output 140, and particularly to one or more tracking metrics and expected progression thereof. The objective refinement system 150 may further be configured to compare differences in the expected metrics and the live data and compare the differences to a threshold to determine if the differences trigger a threshold condition indicating an IROP. The threshold condition may indicate that a new baseline of operation is to be implemented based at least in part on a new and updated optimization. In some example embodiments, meeting the threshold condition may result in performing a reformulated re-optimization.

The objective refinement system 150 in example embodiments, may also know of the mesh information collected by the MOEA system 130 during an initial optimization. This mesh information may be used by either or both of the objective refinement systems 150 and/or the MOEA system 130 to identify a starting point for performing a re-optimization. In some further example embodiments, the objective refinement system 150 may provide direction for creation of child population(s) for evaluation during the re-optimization.

Figure 2:
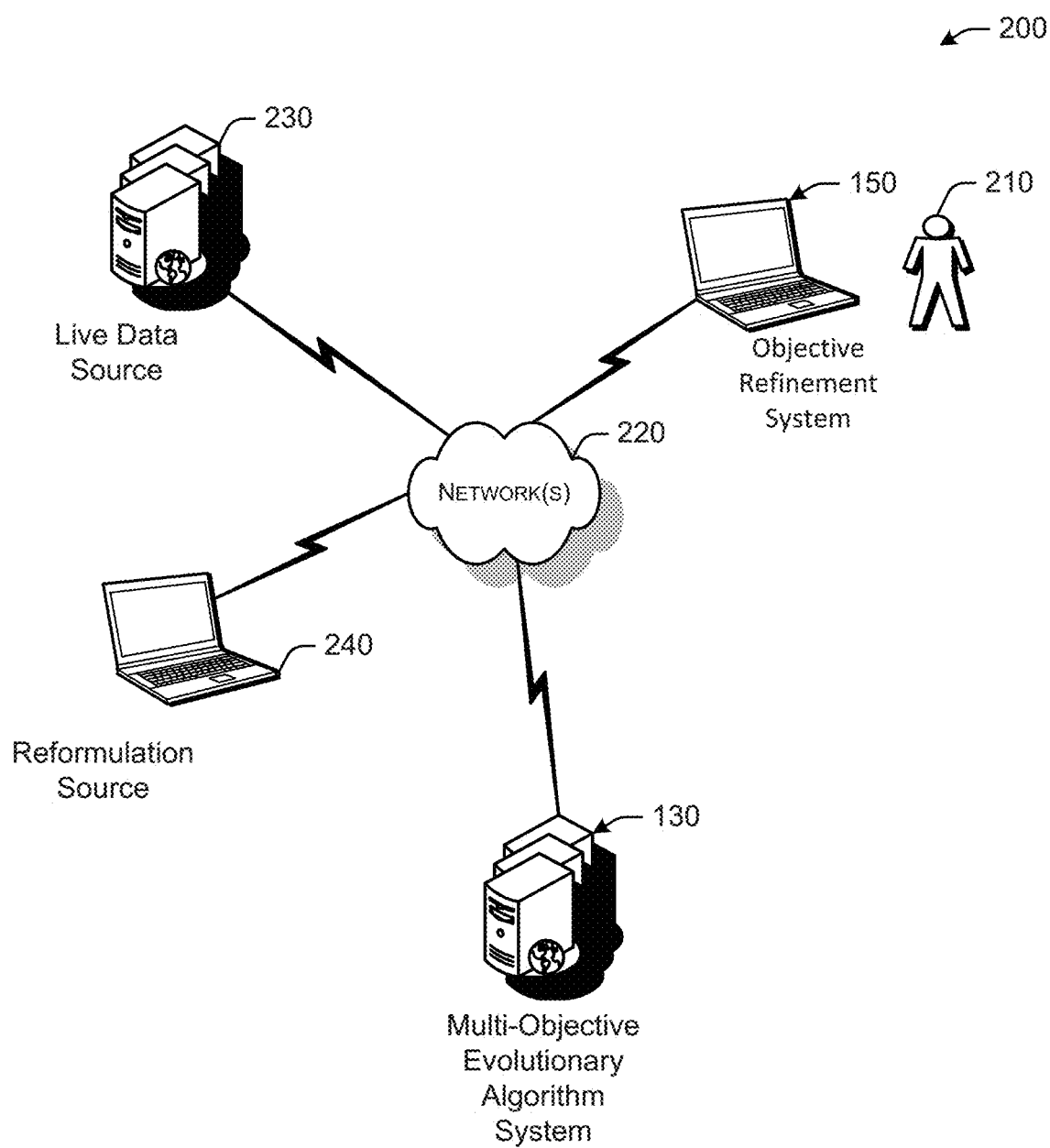
FIG. 2 is a schematic diagram that illustrates an example environment with the MOEA system and the objective refinement system of FIG. 1, in accordance with example embodiments of the disclosure.

FIG. 2 is a schematic diagram that illustrates an example environment 200 with the MOEA system 130 and the objective refinement system 150 of FIG. 1, in accordance with example embodiments of the disclosure. The example environment 200 may further include a network 220 and one or more live data sources 230 and/or reformulation source 240.

The network(s) 220 may include any one or a combination of different types of suitable communications networks, such as cable networks, the Internet, wireless networks, cellular networks, and other private and/or public networks. Furthermore the networks may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

In some example embodiments, the MOEA System 130 and the objective refinement system 150 may be co-located. In other example embodiments, the objective refinement system 150 may be located in a location separate from the MOEA system 130. For example, in example embodiments, the MOEA system may be a multi-core, massively parallel processing, mainframe, and/or a super-computer that may be located in a particular location and accessed by the objective refinement system 150, via the network(s) 220, from a customer location. In other example embodiments, the objective refinement system 150 may be co-located with the MOEA system 130.

In example embodiments, there may be a variety of sources 230 of live or near-live data. These live data source(s) 230 may be co-located with the objective refinement system 150 in some example embodiments. In other example embodiments, the live data source(s) 230 may be located remotely from the objective refinement system 150. In yet other example embodiments, some live data source(s) 230 may be co-located with the objective refinement system 150 and other of the live data source(s) 230 may be located remotely to the objective refinement system 150. The objective refinement system 150 may be configured to receive any variety of live data from the live data source(s) 230 including, but not limited to, sensor data, logging data, narrative messages, tracking data, temporal data, spatial data, monetary data, parameter measurements, combinations thereof, or the like.

In a non-limiting example, there may be a live data source 230 at various airports served by an airline network, where each of the live data source(s) 230 may be reporting timeliness of flights departing from that airport to a centrally located objective refinement system 150. In another non-limiting example, there may be a plurality of live data source(s) 230 distributed throughout a factory and reporting manufacturing parameters and/or measurements to a central objective refinement system 150. It will be appreciated therefore, that the live data source(s) 230 may be captive sources or distributed sources and the data therefrom may be received by any suitable mechanism by the objective refinement system 150, such as via the network(s) 220.

In example embodiments, the objective refinement system 150 may be any suitable user device including, but not limited to, a mobile phone, a smartphone, a tablet computing device, an electronic book (ebook) reader, wearable devices, smart watches, netbook computers, notebook computers, laptop computers, desktop computers, personal digital assistants (PDA), web-enabled televisions, video game consoles, set top boxes (STB), smart appliances, cameras, navigation systems, in-vehicle infotainment systems, combinations thereof, or the like.

The objective refinement system 150 may be configured to receive an initial optimization and/or current optimization from the MOEA system 130 and/or a variety of parameters associated with the initial and/or current optimization. The objective refinement system 150 may be configured to display and/or communicate the initial optimization to an operator 210 and/or a group of operators 210. In other example embodiments, separate systems may exist for displaying the initial optimization to the operator 210. In example embodiments, the objective refinement system 150 may be configured to physically initiate or help initiate the initial optimization and/or any subsequent re-optimization with reformulation of the optimization. In other example embodiments, the objective refinement system 150 may receive an indication of a reformulation from the reformulation source 240. The reformulation source 240 may be configured to provide any changes in the objectives, decision variables, objective models, constraint models, or the like.

In example embodiments, events that have transpired may already be frozen out in reformulated re-optimizations. The decision variables to be frozen out, in example embodiments, may be provided by the objective refinement system 150 to the MOEA system 130. Furthermore, in example embodiments, the re-optimizations, as performed by the MOEA system 130, such as in a periodic or continuous manner may use a reduced set of decisions variables and/or reduced set of objectives. The parameters for the re-optimizations (e.g., decision variables, objectives, box sizes, stopping criteria, etc.) may be provided, in example embodiments in accordance with the disclosure, to the MOEA system 130 by the objective refinement system 150.

Figure 3:
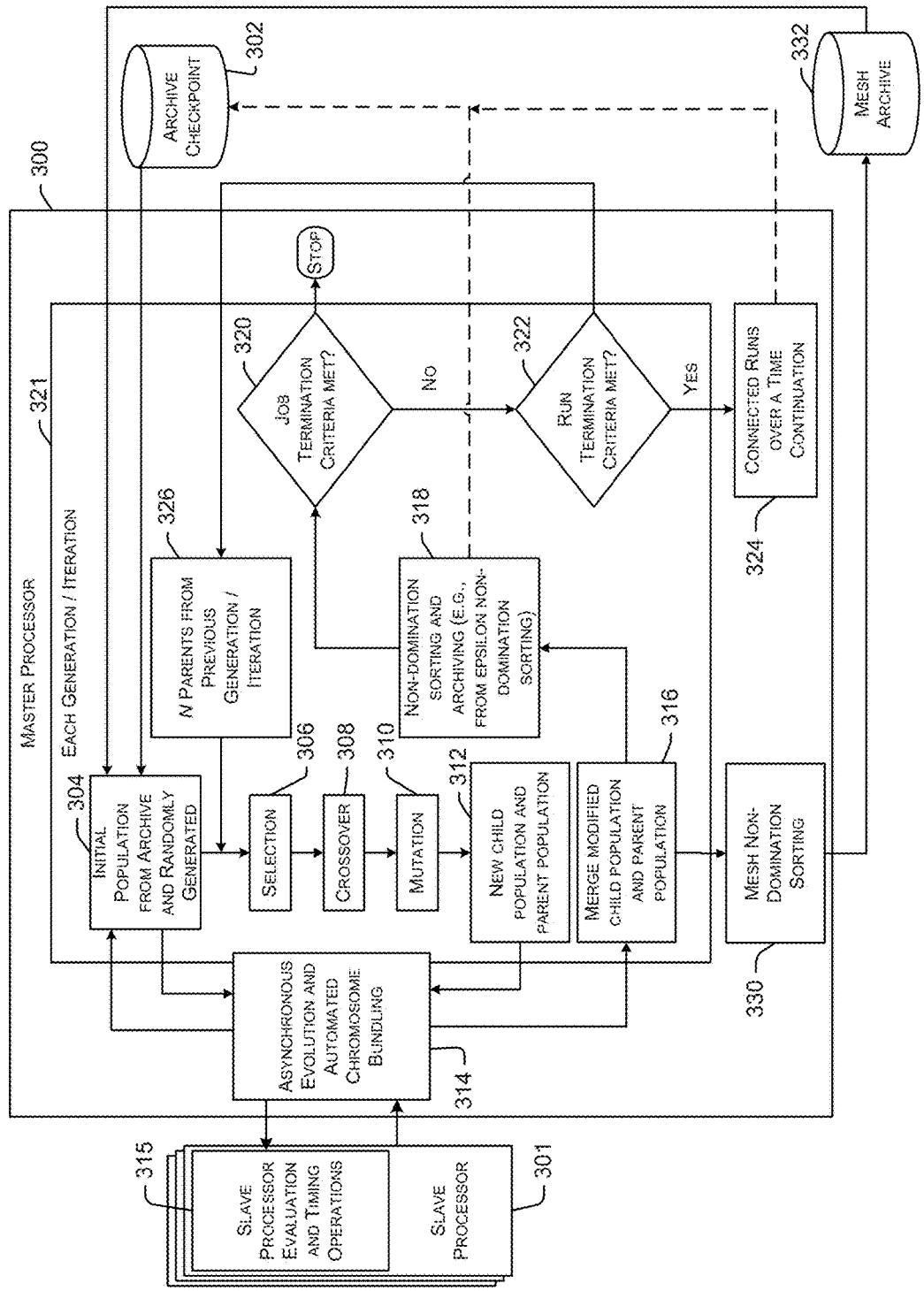
FIG. 3 is a block diagram that illustrates the example MOEA system with meshing of an objective space of FIG. 1, in accordance with example embodiments of the disclosure.

FIG. 3 is a block diagram that illustrates the example MOEA system 130 of FIG. 1, in accordance with example embodiments of the disclosure. In some example embodiments, the MOEA system 130 may be an evolutionary algorithm system, such as those described in at least U.S. Pat. Nos. 8,255,344 and 8,285,653, both of which are incorporated herein, in their entirety by reference.

The evolutionary algorithm system 130 may employ techniques of biologic natural selection to efficiently search a multi-objective optimization space that may not be amenable to search by analytic, iterative, or other methods. In example embodiments, the search variables or decision variable, such as the prices of various items in a pricing problem, may be organized as a data structure that resembles genes in a chromosome or data elements in a data array. In example embodiments, the decision variables of the optimization problem (e.g., pricing problem) may be organized as an allocation of variables that are to be optimized according to the multiple objectives of the optimization problem. In other words, the solution may be represented as a data structure having the various decision variables. In some example embodiments, the solutions may be organized as chromosomes with genes (e.g., individual decision variables) at the MOEA system 130.

Upon organizing the search variables, the evolutionary algorithm may proceed to generate child chromosomes, from parent chromosomes. Therefore, in example embodiments, the "children" to evaluate in any given generation may be based, at least in part on the "parents" or a subset thereof, from the previous generation. The evolutionary algorithm may be configured to evaluate the chromosomes (e.g., prices of items, schedule of train departures, etc.) from any given generation, based at least in part on the corresponding respective performance on the multiple objectives that are being used to evaluate the optimization problem (e.g., pricing optimization, schedule optimization, etc.). The evolutionary algorithm system 130, may further be configured to select those chromosomes (e.g., solutions) that display the best performance according to the multiple objectives, in any given generation and use those chromosomes to generate children by crossover. Crossover may introduce diversity, while preserving as-yet known advantageous genes, into the population of solutions to be evaluated and considered within the search space to arrive at an optimal solution. The evolutionary algorithm system may further be configured to introduce mutations (i.e. random or pseudo-random changes in one or more genes of a child chromosome) to introduce further diversity of potential solutions within the search space for the purposes of selecting a relatively optimized solution set (e.g., flight times in an airline network) in accordance with the identified objectives of the optimization. When new child solutions are generated using the biological-styled processes described above, a check for feasibility may be performed. If a potential solution is not feasible, then in some example embodiments, a drive to feasibility may be performed, such as by a constraint minimization engine. In other example embodiments, potential solutions that are found to be not feasible may be eliminated from the population of solutions that are to be evaluated from a multi-objective standpoint. In yet other example embodiments, solutions that are found to be not feasible may be retained in the population to be evaluated on a multi-objective performance basis. In some of these cases, the non-feasible solutions may be retained for a limited period of time (e.g., one generation, predetermined number of generations, etc.). In the same or other cases, the non-feasible solutions may be tagged as such, so that the genetic material of the non-feasible solutions may be used to drive to more optimized solutions, without allowing the non-feasible solutions to be presented as an optimized solution.

According to example embodiments of the disclosure, the MOEA system 130 may further be configured to generate a collection of mesh points mapping the objective space of an optimization. Although the mesh points and the meshing of the objective space may not lead to any resource (e.g., compute resources, time, etc.) efficiency in the current optimization, the mesh information may be used in a re-optimization, such as a reformulated re-optimization.

It can be seen that the mechanisms used by the evolutionary algorithm (e.g., genetic operators, selection, crossover, mutation, etc.), particularly in the form of a multi-objective evolutionary algorithm system 130, are not mechanisms that are limited to arrive at a convergence in an iterative fashion. Indeed, the mechanism is one that employs intelligent "hopping around" and evaluating according to optimization objectives and/or constraint limitations, rather than just a convergence mechanism. It will be appreciated that such as framework may be amenable to solving multi-objective, multi-dimensional, and/or highly constrained problems, where relative pockets of "good performance" and/or optimized performance according to the optimization objectives may not always be contiguous. In these types of problems, analytical methods (e.g. Lagrange multipliers, etc.), iterative convergence methods (e.g. Newton's method, etc.), and/or methods that rely on relatively high degree of a priori knowledge of trade-offs in the search space may not be as effective at arriving at an optimized solution as the multi-objective evolutionary algorithm system 130, as described herein. Although the multi-objective evolutionary algorithm system 130 is discussed herein, it will be appreciated that any suitable system for implementing a heuristic optimization, such as, but not limited to Monte Carlo methods, extremal optimization (EO) methods, etc. may be implemented in accordance with example embodiments of the disclosure.

In this example embodiment, the MOEA system 130 may be implemented as an example parallel processing system that executes an evolutionary algorithm, according to an example embodiment of the disclosure. As shown in FIG. 3, a first portion of the evolutionary algorithm may be performed by a master processor 300 while a second portion of the evolutionary algorithm may be performed by one or more slave processors 301, as discussed herein. In some example embodiments, the constraint and/or objective evaluation may be implemented on the slave processor(s) 301, while the objective optimization engine may be implemented on the master processor 300.

In an example embodiment of the disclosure, an executed job of the evolutionary algorithm may comprise a plurality of connected runs 322 that occur in a sequence to form a time continuation. Each run 322 may comprise one or more evolutionary operations performed during one or more generations/iterations 321. It will be appreciated that a run may be connected to a prior run in that at least some of the same parents are shared in the "initial population" of launch parameters utilized for initiating respective runs, according to an example embodiment of the disclosure.

Example processing by an executed job of the evolutionary algorithm will now be discussed in further detail. Referring now to block 304, the master processor 300 may receive or obtain an initial population of parent chromosome data structure (e.g., an initial set of prices that may be allocated to one or more hotel room types (items)). In other words, the initial population may represent a starting point, such as a best guess or a set of parameters that may represent the current implementation prior to the benefits of the optimization(s), as described herein. In an example embodiment of the disclosure, each parent chromosome data structure (e.g., departure times in a scheduling problem, prices for items in a pricing problem, etc.) may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Math Variable: A variable may be derived based upon an equation using operands comprising either constants or variables that specify values from other elements specified. The variable names may follow the name convention <alphabetic character><number>, where the <alphabetic character> may specify the column position of elements within an array and/or spreadsheet, and the <number> may specify, the row position within the array and/or spreadsheet. It will be appreciated that a math variable may be a fixed or constant value (double precision or integer precision).

Function Variable: A variable may be produced by a function call, which may include calling arguments of a plurality of other constants, and variables.

Any one of the static variables, evolved variables, the derived variables, the math variables, and/or the function variables may be of a variety of types including, but not limited, to integer, double precision, characters, Boolean (two possible values, e.g. 'ON' or 'OFF'; '0' or '1'; 'TRUE' or 'FALSE'), pair of double precision numbers pair of integers array of double precision numbers, array of integers file/spreadsheet, and/or Gaussian.

Still referring to block 304, the initial population of parent chromosome data structures may be obtained by one or more sources. In an example embodiment of the disclosure, the initial population of parent chromosome data structures may be obtained from a combination of the archive checkpoint 302 and random generation of new chromosome data structures. The archive checkpoint 302 may include a known solution, such as an experiential solution. As a non-limiting example, 25% of the initial population of parent chromosome data structures may be obtained from the archive checkpoint 302 while 75% of the initial population may be randomly generated. The chromosomes obtained from the archive checkpoint 302 may have previously been evaluated in accordance with the objective functions. On the other hand, the randomly generated chromosomes may not have been evaluated in accordance with the objective functions, and thus, they may be delivered to block 314, which allocates the chromosomes to the slave processors 301 for objective function evaluation by block 315. In certain embodiments, the initial population of parent chromosomes may include one or more known solutions, or a baseline solution, provided to the heuristic optimizer system in the form of an evolutionary algorithm system. In some example embodiments, if the current optimization is a reformulated re-optimization, then the chromosomes in the initial population at block 304 may be received from a mesh archive 332 and/or an objective refinement system 150 that has access to the mesh archive 332.

The archive checkpoint 302 may include an elite set of chromosome data structures (i.e., elite solutions of scheduled departure times) obtained from one or more prior generations/iterations 321, according to an example embodiment of the disclosure. Initially, the archive checkpoint 302, in certain embodiments, may be populated with one or more known solution chromosomes, such as a baseline chromosome solution. Alternatively, if no baseline solution is known, the archive checkpoint may initially be populated with a derived known solution using a variety of suitable mechanisms, such as vastly infeasible search space mechanism. The archive checkpoint 302 may take the form of a data file or database stored in a computer memory, computer disk, network storage, or other non-volatile memory. In accordance with embodiments of the disclosure, the archive checkpoint 302 may contain one or more elite set of chromosomes, such as known solutions.

The mesh archive 332 may also take the form of a data file or database stored in a computer memory, computer disk, network storage, or other non-volatile memory. In accordance with embodiments of the disclosure, the mesh checkpoint 332 may contain one or more mesh chromosomes that were visited in previous generations of the present optimization and/or during previous optimizations. The mesh chromosomes stored in the mesh archive 332 along with their location in the objective space may represent relatively interesting locations in the objective space, even if those locations may be dominated. Objective space, as used herein, may be a multi-dimensional space (e.g., 2D, 3D, hyperdimensional, etc.) where each of the axis are the objectives of the optimization problem.

Archived chromosome data structures that were previously evaluated in a prior generation/iteration 321 may be associated with a plurality of objective function values corresponding to a respective plurality of objective functions. Each objective function may be associated with any predefined objective to be optimized by the executed job of the evolutionary algorithm. For example, in a pricing problem, an objective function may be associated with achieving a high profit level, and a corresponding objective function value may indicate which chromosome data structure (based upon the included chromosome and its respective genes) is able to achieve the greatest profit. It will be appreciated that in many cases, there may be multiple objectives. It will further be appreciated that in some cases, one or more of the objectives may not be independent of each other. Indeed, the objective functions may have non-zero correlation to each other. It will yet further be appreciated that the objective functions may be of any suitable variable type, such as integer, double precision, characters, Boolean, or the like.

Alternatively, in block 304, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 314, which may allocate the chromosomes to the slave processors 301 for objective function evaluation and/or constraint function evaluation by block 315. Once the objective function evaluations in block 315 have been completed, and the objective function values have been received in block 314, then each of the randomly generated parent chromosome data structures may be associated with a respective plurality of objective function values.

Having received or obtained the initial population of parent chromosome data structures in block 304, processing may then proceed to block 306. In block 306, the master processor 300 may select pairs of parent chromosome data structures from the input population of parent chromosome data structures. In an example embodiment of the disclosure, the selection of the pairs of parent chromosome data structures may occur according to a tournament selection process, which may include a crowded tournament selection process. An example tournament selection process in accordance with an example embodiment of the disclosure may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the disclosure. The winners of each tournament become the two parents resulting from the selection process of block 306. It will be appreciated that a predetermined number of pairs of parent chromosome data structures may be selected in block 306. It will also be appreciated that a particular parent chromosome data structure may be present in two or more selected pairs of parent chromosome data structures, according to an example embodiment of the disclosure. In some cases, the number of parent chromosomes selected in each round or iteration may be dynamic.

Following block 306, the chromosomes in selected pairs of parent chromosome data structures may be subject to one or more evolutionary operators to generate a plurality of child chromosome data structures, according to an example embodiment of the disclosure. Two example evolutionary operators are illustrated by blocks 308 and 310. For example, block 308 illustrates a crossover evolutionary operator in which a portion of the parameter values or "gene" values (i.e. individual launch parameters of a satellite of the satellite constellation under design) may be exchanged between chromosomes in selected pairs of parent chromosome data structures to generate new pairs of chromosome data structures. In an example embodiment of the disclosure, the crossover evolutionary operation may be capable of performing crossover using integer or non-integer numbers (e.g., double precision numbers, etc.), binary representation of numbers, letters, and/or symbols. As another example, block 310 illustrates a mutation evolutionary operator in which a parameter value or gene value (e.g., an evolved variable value) in a chromosome may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the disclosure, only a portion or percentage of the received chromosomes in the chromosome data structures in blocks 308 and 310 may have their genes crossed-over or mutated, respectively. The respective portions or percentages that are crossed-over and/or mutated may be predetermined or dynamically varied during operation of the evolutionary algorithm, according to an example embodiment of the disclosure. For example, a first predetermined portion or percentage (e.g., 50%-80%) of the received chromosomes of the chromosome data structures may have genes that are crossed over in block 308 while a second predetermined portion or percentage (e.g., 1%-3%) of the received chromosomes of the chromosome data structures may have genes that are mutated in block 310. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 308 and 310 may be available without departing from example embodiments of the disclosure. Likewise blocks 308 and 310 may be performed in a different order than that shown in FIG. 3 or otherwise combined into a single block without departing from example embodiments of the disclosure.

After the evolutionary operations of block 306, 308, and 310, a new population of child chromosome data structures (i.e. launch parameters to be evaluated) may be obtained in block 312. Following block 312, processing may proceed to block 314. In block 314, the new population of child chromosome data structures may be received into a "To Evaluate" list or queue. Block 314 may then allocate the chromosome data structures from the "To Evaluate" list or queue to the plurality of slave processors 301 according to an asynchronous evolution process. An automated chromosome bundling process may also be utilized in block 314 to determine how many chromosome data structures should be included in a respective chromosome bundle for a respective slave processor 301. For example, a slave processor 301 with faster processing capability may receive a chromosome bundle with a larger number of chromosome data structures. Alternatively, the slave processor 301 may receive a fixed number of launch parameters sets in the form of chromosome data structures in a chromosome bundle, but simply receive a larger number of chromosome bundles within a predetermined amount of time. The example automated chromosome bundling process may allow efficient allocation of chromosome data structures among the plurality of slave processors 301. In some cases, a number of flags, indicating the number of genes that are permitted to be considered as deviating from the baseline solution chromosome, may be considered in the bundling process.

In block 315, each slave processor 301 may have received a chromosome bundle comprising one or more chromosome data structures from the master processor 300. Additionally, in certain embodiments, the slave processors 301 may further receive a baseline chromosome or solution organized in any manner, representing a known solution. The slave processors 301 may be homogenous or heterogenous in processing capability. Each slave processor 301 may evaluate, in accordance with a plurality of objective functions, the received chromosome bundle of chromosome data structures, and/or the baseline solution chromosome to generate a plurality of respective objective function values for each chromosome data structure in block 315. In some example embodiments, the slave processors 301 may further perform the functions of constraint minimization. The slave processors 301, therefore, in example embodiments, receive a solution to be both constraint minimization driving, in addition to objective value determination. In addition, each slave processor 301 may also perform timing operations or calculations, including determination of certain wait times and/or evaluation times associated with the respective slave processor 301, in block 315. As each slave processor 301 finishes the objective function evaluations and/or timing operations in block 315, the slave processor 301 may provide a results bundle (e.g., objective function values) and timing data (e.g., wait times and/or objective function evaluation times) to the master processor 300. The slave processor 301 may further receive, in example embodiments, a constraint violated solution and return a constraint non-violated solution to the master processor 300. As a result, the constraint minimization engine may be implemented on the slave processors 301 in accordance with example embodiments. In some of these example embodiments, the slave processors 301 may further provide objective values, as determined using the objective models 120, along with the non-constraint solutions. The master processor 300 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 301. Indeed, the evolutionary process may be asynchronous in that as soon as the "To Evaluate" list is empty for a given generation/iteration 321, the processing taking place in block 314 is completed, where the child population passed to block 316 is comprised of all of the chromosome data structures currently within the "Finished" list. It will be further appreciated that the results from some of the chromosome bundles previously sent to the various slave processors 301 may not have been received at the time the "To Evaluate" list is emptied. These may be referred to as late chromosome data structures from one or more prior generations/iterations.

In block 316, the master processor 300 may receive a modified child population of chromosome data structures from the asynchronous evolution process of block 314. In certain embodiments, the modified child population may include different chromosome structures as well as a different number of chromosome data structures as compared to the child population of block 312. The received modified child population is merged with the current parent population, as illustrated by block 316. In block 318, the master processor 300 may perform non-domination sorting (e.g., based off of an epsilon vector) of the merged list of child and parent chromosome data structures of launch parameter sets under evaluation to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

Accordingly, non-domination sorting in block 318 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the disclosure, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/ iteration may be stored in the archive checkpoint 302 or another archive of a computer memory or other data storage for subsequent retrieval. At this point, the solutions (e.g., chromosomes), as stored in the checkpoint 302, may be generated based at least in part on both objective function based evaluation of the objective optimization engine 210 and constraint minimization based evaluation of the constraint minimization engine 220.

In addition to providing the merged population of chromosomes to the processes of block 318, at block 316, the merged population of evaluated chromosomes may also be provided for mesh non-dominated sorting of block 330. The processes of block 330 may determine if a particular chromosome is to be stored as a mesh chromosome. In some cases, the mesh chromosome may be non-domination sorted versus all of the other chromosomes received from the processes of block 316 according to one or more mesh objectives. The mesh objectives may be different from the objectives of the overall optimization problem. For example, the mesh objectives may try to find local minima, maxima, saddle points, regions of steep gradients, regions of shallow gradients, or the like. These mesh objectives may be the slope based on differentials of objectives compared to next nearest neighbor chromosomes in the population of chromosomes. Thus, non-domination ranking of objectives such as minimizing slope (or minimizing the absolute value of the slope) in a particular region of the objective space may be a mechanism by which relatively interesting mesh chromosomes may be identified from a population of chromosomes that are also being evaluated in anon-domination sorting fashion at block 318. In example embodiments, the mesh chromosomes, as identified by the processes of block 330, may be stored in the mesh archive 332, to be accessed in future re-optimization problems.

It will be appreciated that in example embodiments, the mesh chromosomes selected according to the processes of block 330 may be the same or different from the elite chromosomes identified in the processes of block 318. It should also be noted that there may be variations and/or other processes for identifying the mesh chromosomes other than the mechanisms identified above. For example, from every generation 321, the chromosomes that display the smallest and greatest slopes in the objective space relative to a collection of objectives may be deemed mesh chromosomes and stored in the mesh archive 332 along with their location (e.g., coordinates) in the objective space. In some other alternative embodiments, the mesh non-dominated sorting may use an epsilon-space sorting, where only one mesh chromosome may be selected from each epsilon space. In fact, the epsilon-space mechanism may be used to prevent the selection of multiple mesh chromosomes associated with a single local feature (e.g., a mountain and/or valley in the objective space). The epsilon-space exclusive zone for selecting a single mesh chromosome may cause a filtration of minor topology that may be adjacent to a relatively more significant topological feature.

In some example embodiments, during the mesh non-domination sorting of block 330, mesh chromosomes already stored in the mesh archive may also be used considered in the non-domination sorting. If the mesh chromosomes from previous generations 321 were stored in the mesh archive, then the mesh archive may be loaded back into memory and a non-domination sorting may be performed with all of the previously assessed mesh chromosomes from the previous generation, along with the merged chromosomes as received by block 330 from block 316. In other words, all of the potential mesh chromosomes accumulated up until a particular point in the optimization may be considered in identifying chromosomes to retain as mesh chromosomes. For example, if a particular chromosomes that exists in the mesh archive is compared to a new chromosome received from the processes of block 316, and it is determined that the two chromosomes are in the same mesh epsilon-space and/or epsilon box, then the chromosome with the smallest slope with respect to one or more objectives may be retained. Thus, it will be appreciated that a mesh chromosome already stored in the mesh archive may be rejected as a mesh chromosome in favor of a new chromosome that may dominate that previously deemed mesh chromosome. In this way, a relatively small set of mesh chromosomes may be retained that provide an indication of features in the objective space without providing unnecessary over-mapping and/or over-meshing.

Following processing in block 318, processing may proceed to block 320. In block 320, a determination is made as to whether the current job is completed such that the evolutionary algorithm should be terminated. A job typically comprises processing involving a plurality of connected runs 324, where each run 324 may include processing associated with one or more generations/iterations 321. Block 320 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria. In other words, the optimization may terminate if the improvements on a predetermined number of iterations of the objective optimization with non-constraint solutions have not improved substantially. In an example embodiment of the disclosure, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations. It will be appreciated that the obtained solutions comprising the chromosome data structures may be output in a variety of formats, including a database format, a comma separated value (CSV) format, or a graphical format.

If block 320 determines that the job is not complete, then processing may proceed to block 322 to determine whether the current run 324 has completed. In determining whether the current run is complete, block 322 may determine whether a current run 324 has failed to produce improvement in quantity and quality of the solutions generated from the prior iterations/generations 321. The quantity measure may be based upon the number of solutions. The quality measure may be based on some quantification of distance from a utopia point, box fitness, or yet another measure.

If block 322 determines that a current run 324 is not complete, then processing may proceed to block 326, wherein a population of parent chromosome structures may be obtained or otherwise selected from the elite chromosome data structures determined from block 318. The prior process may then be repeated for another generation/iteration 321 using the parent chromosome data structures from the prior generation/iteration. It will be appreciated that because the evolution process of block 314 is asynchronous, there may be one or more late child chromosome data structures received in the "Finished" list or queue in 316 that are associated with one or more pairs of parent chromosome data structures allocated to slave processors 301 during one or more prior generations/iterations. Therefore, in the next generation/iteration 321, the merged children chromosome data structures in block 316 may likewise include those late child chromosome data structures as well as current child chromosome data structures from parent chromosome data structures allocated to slave processors 301 during the current generation/iteration 321.

On the other hand, block 322 may determine that a current run 324 is complete. For example, looking back over a predetermined number of generations, the search may have failed to produce improvement in the solutions during each generation/iteration 321 of the current run 324. Improvement may be based upon the quantity of the solutions (e.g., the number of solutions) and the quality of the solutions (e.g., some quantification of distance from a utopia point, box fitness, etc.). In this case, the current run 324 may be completed, and processing proceeds to initiate a subsequent run 324. The subsequent run 324 may generate an initial population by invigorating the elite solutions stored in the archive checkpoint 302. In particular, the subsequent run 324 may utilize a first number of the elite solutions from the archive checkpoint 302 as part of the initial population utilized in block 304, but may also invigorate the initial population by adding a second number of randomly generated parent chromosome data structures. In example embodiments, the elite solutions may be non-constraint solutions. In example embodiments, the elite solutions may be non-constrained. The randomly generated parent chromosome data structures may be generated and evaluated using the example processes discussed with respect to blocks 304 and 314.

In some example embodiments, the processors 300, 301 of the MOEA system 130 may be implemented as appropriate in hardware, software, firmware, or combinations thereof. Software or firmware implementations of the processors 300, 301 may include computer-executable or machine-executable instructions written in any suitable programming language to perform the various functions described. Hardware implementations of the processors 300, 301 may be configured to execute computer-executable or machine-executable instructions to perform the various functions described. The one or more processors 300, 310 may include, without limitation, a central processing unit (CPU), a digital signal processor (DSP), a reduced instruction set computer (RISC), a complex instruction set computer (CISC), a microprocessor, a microcontroller, a graphical processor unit (GPU), a field programmable gate array (FPGA), or any combination thereof. The multi-tiered optimization system 130 may also include a chipset (not shown) for controlling communication between the one or more processors 300, 301 and one or more of the other components of the multi-objective optimization system 130. The one or more processors 300, 301 may also include one or more application specific integrated circuits (ASICs) or application specific standard products (ASSPs) for handling specific data processing functions or tasks. In example embodiments, the MOEA system 130 may further include input/output (I/O) device(s) such as display screen(s), touch sensitive display screen(s), speaker(s), haptic device(s), or the like, may be controlled via one or more I/O device interfaces.

The MOEA system 130 may still further include memory for storing applications and/or instructions that may be executed by the processors 300, 301 to perform functions described herein. The memory may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof.

It will be appreciated that the solutions as determined by the MOEA system 130 may be optimized for multiple objectives, while being viable (in accordance with all constraints of the optimization problem). Many-objective optimization not only allows one to independently quantify the various coverage criteria but also allows one to do this in a way that minimizes simplifying assumptions. The goal of multiple-objective optimization, in contrast to the single-objective optimization case where the global optimum is desired (except in certain multimodal cases), is to maximize or minimize multiple measures of performance simultaneously whereas maintaining a diverse set of Pareto-optimal solutions. The concept of Pareto optimality refers to the set of solutions in the feasible objective space that is non-dominated. A solution is considered to be non-dominated if it is no worse than another solution in all objectives and strictly better than that solution in at least one objective. Consider a situation where both f1 and f2 objectives are to be minimized, but where the two objectives are in conflict, at least to some extent, with each other. Because both objectives are important, there cannot be a single solution that optimizes the f1 and f2 objectives; rather, a set of optimal solutions exists which depict a tradeoff.

Figure 4A:
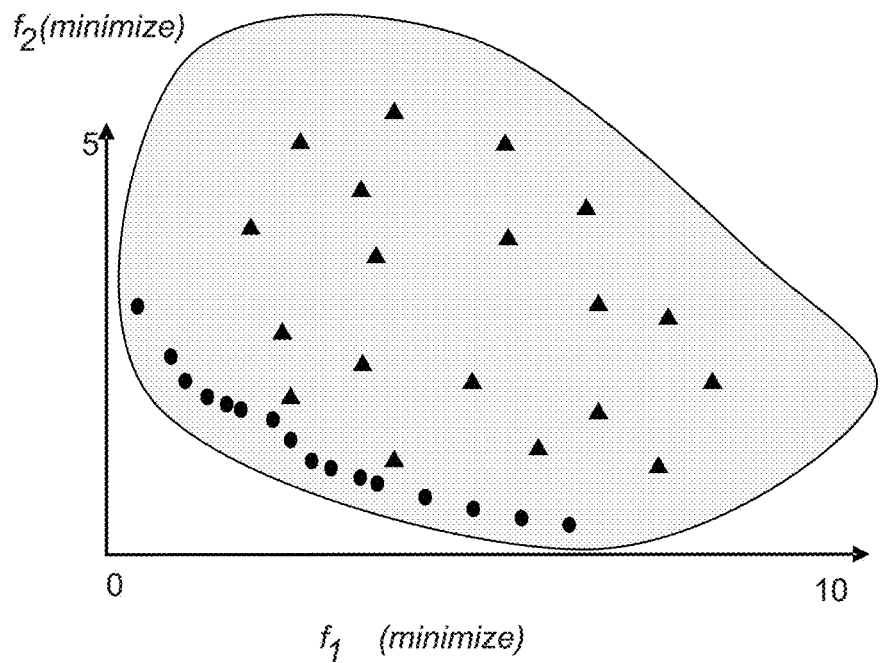
FIGS. 4A and 4B are charts illustrating an example pareto-optimized solution to a multi-objective problem, in accordance with example embodiments of the disclosure.
Figure 4B:
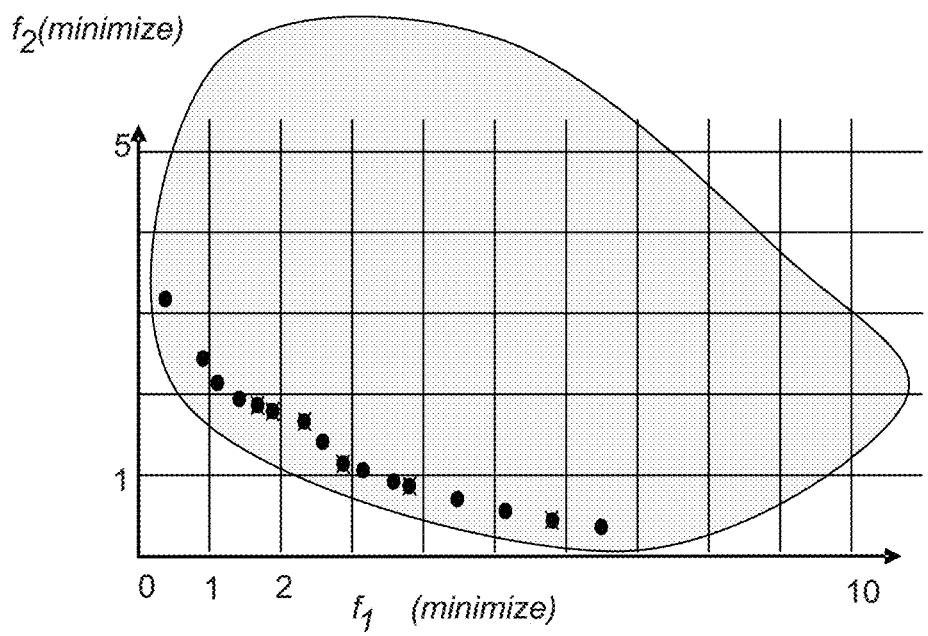

FIGS. 4A and 4B are charts illustrating an example pareto-optimized solution to a multi-objective problem, in accordance with embodiments of the disclosure. Initially, a first non-domination sorting may be applied to the current population to remove solutions that are dominated by at least one other solution in the objective space. It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population. Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\varepsilon_1$ associated with objective function $f_1$, and a second epsilon value may be associated with second epsilon spacing or step size $\varepsilon_2$ associated with objective function $f_2$. Each solution may then be associated with an epsilon vector or epsilon box address $(\varepsilon_1, \varepsilon_2)$ corresponding to the first epsilon value and the second epsilon value. If two or more solutions have the same epsilon box address, then the epsilon non-domination sorting may retain a single solution per epsilon box address $(\varepsilon_1, \varepsilon_2)$. This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention. For example the f1 and f2 values may correspond to profit and revenue in item pricing problems.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

FIG. 4A illustrates a feasible design region associated with a first objective function $f_1$ and a second objective function $f_2$. Within the feasible design region is a snapshot of a population of solutions of a given generation/iteration, according to an example embodiment of the invention. Based upon the goal of minimizing the first and second objective functions $f_1$ and $f_2$, non-domination sorting identifies all of the circles as being non-dominated solutions and all of the triangles as dominated solutions. The dominated solutions may be eliminated from the population or removed from further consideration, according to an example embodiment of the invention. It will be appreciated that the goals of minimizing the f1 and f2 are merely an example. In other examples, such as in a pricing problems, the goal may be to maximize f1 and f2, particularly if f1 is revenue and f2 is profit. In yet other optimization problems, the goal may be to maximize f1 and minimize f2, or vice-versa.

In FIG. 4B, epsilon non-domination sorting may be applied to the remaining solutions (e.g., non-eliminated solutions) from the first non-domination sorting of FIG. 4A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 4B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention. Additionally, the non-dominated solutions may be feasible due to the constraint minimization mechanism, as implemented by the constraint minimization engine 220.

Figure 5:
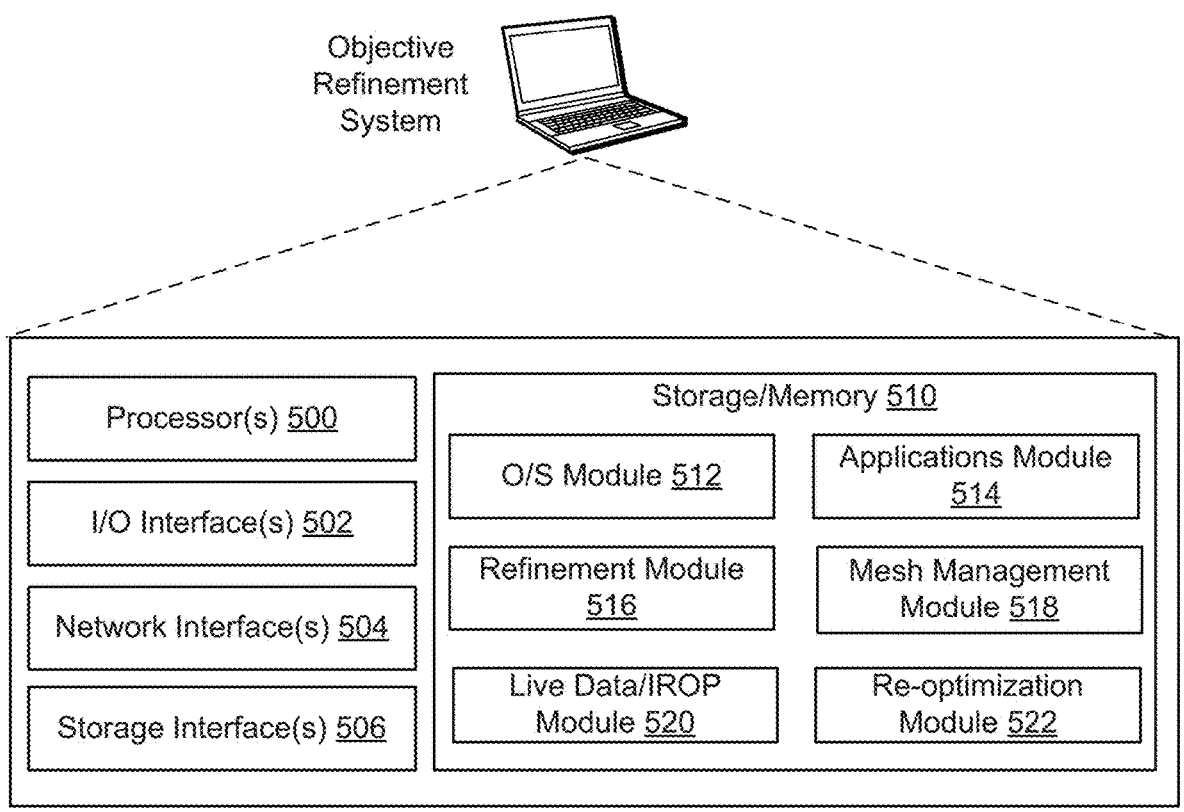
FIG. 5 is a block diagram that illustrates the example objective refinement system of FIGS. 1 and 2, in accordance with example embodiments of the disclosure.

FIG. 5 is a block diagram that illustrates the example objective refinement system 150 of FIGS. 1 and 2, in accordance with example embodiments of the disclosure. The objective refinement system 150 may include one or more one or more processor(s) 500, one or more input/output (I/O) interface(s) 502, one or more network interface(s) 504, one or more storage interface(s) 506, and one or more storage or memories 510.

In some examples, the processor(s) 500 of the objective refinement system 150 may be implemented as appropriate in hardware, software, firmware, or combinations thereof. Software or firmware implementations of the processors 500 may include computer-executable or machine-executable instructions written in any suitable programming language to perform the various functions described. Hardware implementations of the processors 500 may be configured to execute computer-executable or machine-executable instructions to perform the various functions described. The one or more processor(s) 500 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The objective refinement system 150 may also include a chipset (not shown) for controlling communications between the one or more processor(s) 500 and one or more of the other components of the objective refinement system 150. The one or more processor(s) 500 may also include one or more application specific integrated circuits (ASICs) or application specific standard products (ASSPs) for handling specific data processing functions or tasks.

The I/O interface(s) 502 may enable the IROP system 150 to receive and/or provide input and/or output from/to one or more user interface(s). Some example user interface(s) may include touch sensitive screens, buttons, switches, microphones, speakers, haptic devices/vibrators, mice, keyboards, combinations thereof, or the like. The user interface(s) may be configured to interact with the processor(s) 500 enabled by the I/O interface(s) 502 of the objective refinement system 150. The network interfaces(s) 504 may allow the advertisement objective refinement system 150 to communicate via one or more network(s) 220 and/or via any other suitable communicative links. The storage interface(s) 506 may enable the objective refinement system 150 and the processor(s) 500 thereon to access, read, and write to the storage/memory 510 and/or other external storage devices and/or databases.

The storage/memory 510 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (FRAM), universal serial bus (USB) removable memory, or combinations thereof.

The storage/memory 510 may store program instructions that are loadable and executable on the processor(s) 500, as well as data generated or received during the execution of these programs. Turning to the contents of the storage/memory 510 in more detail, the storage/memory 510 may include one or more operating systems (O/S) module 512, an application(s) module 514, an refinement module 516, a mesh management module 518, a live data/IROP module 520, and a re-optimization module 522. Each of the modules and/or software may provide functionality for the objective refinement system 150, when executed by the processor(s) 500. The modules and/or the software may or may not correspond to physical locations and/or addresses in storage/memory 510. In other words, the contents of each of the modules 512, 514, 516, 518, 520, 522 may not be segregated from each other and may, in fact be stored in at least partially interleaved positions on the storage/memory 510.

The O/S module 512 may have one or more operating systems stored thereon. The processor(s) 500 may be configured to access and execute one or more operating systems stored in the (O/S) module 512 to operate the system functions of the objective refinement system 150. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application module 514 may contain instructions and/or applications thereon that may be executed by the processor(s) 500 to provide one or more services to a user of the objective refinement system 150. These instructions and/or applications may, in certain aspects, interact with the operating system module 512 and/or other modules of the objective refinement system 150. The applications module 514 may include instructions and/or applications therein that when executed by processor(s) 500 enable the objective refinement system 150 to perform a variety of functions that may be desired by the user of the objective refinement system 150. These applications may enable the rendering of content on the objective refinement system 150, performing calculations, word processing, spread sheet, database functions, engineering functions, external device control, communications functionality, navigation functions, social networking, biometric monitoring, content generation, calculations, or any other suitable functions. The applications and certain embodiments may control one or more input/output devices such as touch panels, displays, microphones, sensors or speakers of the objective refinement system 150.

The processor(s) 500, by executing instructions stored in the refinement module 516, may be configured to direct a subsequent optimization after an initial optimization of the processes for which an optimization is desired. The processor(s) 500 may be configured, in example embodiments, to receive indication(s) of one or more parameters, one or more constraints, and/or one or more objectives from the initial optimization. The processor(s) 500 may further be configured to identify that a re-optimization may be needed. In these and other example embodiments, the processor(s) 500 may identify that the re-optimization may involve refinement and/or reformulation of the optimization to be performed. In some example embodiments, the objective refinement system 150 and the processor(s) 500 thereon may receive an indication form the operator 210 that a refinement and re-optimization is to be performed. In some example embodiments, the processor(s) 500 may further receive, from the operator 210 or any other suitable source, the parameters and the reformulations associated with a re-optimization. For example, the processor(s) 500 may receive an indication of a reduced (or increased) set of decision variables and/or a reduced (or increased) set of objectives, and/or any changes in any one of the objective models and/or constraint models.

In some example embodiments, the processor(s) 500, by performing the instructions stored in the refinement module, may be configured to identify a refinement and/or reformulation of an original optimization. This may involve, for example, determining that an IROP condition has transpired and then freezing out all and/or removing from chromosomes all of the decision variables that are related to events that have already transpired. In some cases, the processor(s) may also have a set of rules by which the processors may reformulate an optimization problem. For example, the processor(s) 500, may have rules for an airline that dictate that a thunderstorm in a hub city may result in reformulating a re-optimized route schedule where the objectives include prioritizing minimizing the number of flights delayed. However, during a blizzard, the prioritized objectives may be to minimize average accumulated delays for travelers. In this way, the processor(s) 500, in example embodiments, may be able to apply a collection of pre-established rules to reformulate a re-optimization problem.

In example embodiments, the objective refinement system 150 may be configured to receive these indications from an operator 210, such as via one or more I/O devices operational via the I/O interface(s) 504. In the same or other example embodiments, the processor(s) 500 may be configured to receive the indication(s) of one or more parameters, one or more constraints, and/or one or more objectives via one or more input file(s) specifying each of the aforementioned items for a reformulated optimization. Indeed, in example embodiments, input file(s) may specify such elements as constraint models, objective models, decision variables, additional parameters to be returned with an optimized solution, combinations thereof, or the like.

In some example embodiments, where the MOEA system 130 may be performing continuous and/or periodic re-optimizations, the processor(s) 500 may be configured to provide parameter(s) that may enable, direct, or otherwise specify the continuous and/or periodic re-optimization, and provide the same to the MOEA system 130. In example embodiments, these re-optimization parameters may be received by the processor(s) 500, such as via operator 210 input to the objective refinement system 150. Such parameters, for example, may include a periodicity for re-optimization, number of core(s) to be used for the re-optimization, memory allocation for the re-optimization, constraints for the re-optimization, decision variables for the re-optimization, specification of vectors for identifying decision variables to freeze out, optimization objective(s) for the re-optimization, combinations thereof, or the like.

In some example embodiments, the processor(s) 500 may not be configured to receive additional and/or derived parameters along with the optimized solution. In these case, the IROP system 150 and the processor(s) 500 thereon may be configured to either generate a derived parameter for comparison to live data or compare the optimized decision variables to received live data. As a non-limiting example of comparing optimized decision variables to live data, in a scheduling problem of airline flights in an airline network, the processor(s) 500 may be configured to receive optimized departure times of each flight in the network. The processor(s) 500 using live data, may be configured to compare actual departure times of flights to the optimized departure times, as would be expected of the flights when the optimized solution is implemented. In this case, since the decision variables are the optimized departure times themselves, the comparison by the processor(s) 500 may be to compare live data to the decision variables, as optimized in the multi-objective optimization (initial or re-optimization subsequent to initial).

The processor(s) 500, by executing instructions stored in the mesh management module 518, may be configured to provide to the MOEA system 130 parameters for generating a meshing of an objective space, particularly the objective space during an initial optimization. Such parameters may include meshing objectives and/or threshold values (e.g., slope) at which a particular chromosome may be deemed a mesh chromosome and stored in the mesh archive 332. Additionally, the mesh management module may have instructions stored therein that when executed by the processor(s) 500 may enable the processors to provide initial chromosomes to the MOEA system 130 for a re-optimization and/or hints to directions to proceed during performing a reformulated optimization by the MOEA system 130. In some example embodiments, the processor(s) may direct the MOEA system 130 to the mesh chromosomes that had previously been archived for the purposes of more quickly converging to a reformulated solution.

The processor(s) 500, by executing instructions stored in the live data/irregular operations (IROP) module 520, may be configured to receive live data and compare received live data to the expected progression of that live data to determine if a threshold condition is reached. In some cases, as discussed above, the live data may correspond to the optimized decision variables of the optimized solutions themselves (e.g., comparing departure times of flights to an optimized set of target departure times). In other cases, the live data may be correspond to a derived parameter that may be based on the optimized decision variables, but are not the decision variables themselves (e.g., comparing a factory process yield that is expected by running a process equipment with an optimized set of operational parameters, where the optimized set of operational parameters are the decision variables and the process yield is a derived parameter based on the optimized decision variables). Upon comparing the live data to expected parameters/data, the processor(s) 500 may be configured to determine is an irregular operation exists. In example embodiments, if the difference between one or more or a combination of live data to expectations thereof are great enough (e.g., at or beyond a threshold level), then the processor(s) 500 may be configured to determine that an irregular operation exists. For example, the threshold condition may be that a particular tracking metric exceeds or is lower than a corresponding threshold value, or a majority of tracking metrics exceed or are lower than corresponding threshold values, or that a linear combination of a group of parameters exceed or are lower than a corresponding threshold value.

In example embodiments, the live data may be real-time or near real-time data that may be received as any variety of sensor data, logging data, narrative messages, tracking data, temporal data, spatial data, monetary data, parameter measurements, combinations thereof, or the like. The processor(s) 500 may be further configured to store and/or log the live data, such as in the storage/memory 510 or other suitable storage device(s). The processor(s) 500, by executing the instructions stored in the live data module, may still further be configured to make the live data, as received by the processor(s) 500, available to other processes performed by the processor(s) 500, such as processes involving comparing the received live data to an expected progression of that live data. When an IROP condition is detected, the processor(s) 500 may be configured to execute the instructions of the refinement module 516 to reformulate the optimization problem.

In one non-limiting example, the processor(s) 500 may be configured to receive departure time data corresponding to flights at various airports. The processor(s) 500 may further be configured to determine accumulated delays at each airport by determining a running summation of delays of each flight relative to their expected departure time at each of the airports being monitored. If any of the accumulated delays at any of the airports reach a threshold level, the IROP system 150 and the processor(s) 500 thereon may be configured to declare an irregular operation at that airport. Any type of re-optimization may take into account the delays at an airport that may be operating in an anomalous way.

The processor(s) 500, by executing instructions stored in the re-optimization module 522, may be configured to instantiate a re-optimization, where the re-optimization may be a reformulation of the initial optimization. In some cases, the re-optimization may have a subset and/or a different set of the decision variables of the original optimization, such as because of freeze out of some genes. In the same or other cases, the re-optimization may use a subset and/or a different set of objectives. For example the objectives in a reformulated optimization may change due to new priorities, in light of changes in base conditions (e.g., weather related delays in a hub city of an airline).

In some example embodiments, the processor(s) 500, upon identifying an irregular operation, may be configured to request the MOEA system 130 to perform a re-optimization based at least in part on the latest live data. In some cases, the objective refinement system 150 and the processor(s) 500 thereon may be configured to receive more than one re-optimized solution (e.g., non-dominated solutions along a pareto-front) responsive to requesting a re-optimization after detecting an irregular operation. In this case, the processor(s) 500 may be configured to make a determination of which among the more than one solutions to implement. In other example embodiments, the processor(s) 500 may be configured to present to an operator 210 two or more re-optimization choices of pareto-optimized solutions from which to choose a single optimized solution for implementation. Upon a selection by the operator 210, the processor(s) 500 may be configured to implement and/or initiate implementation of the selected optimized solution. In some cases, this may entail the processor(s) 500 being configured to communicate one or more parameters of the selected re-optimized solution to one or more entities that may implement aspects of the solution (e.g., flight scheduling computers, hotel room sales computers, production engineers, etc.).

In example embodiments, the objective refinement system 150 and the processor(s) 500 thereon may be configured to direct the MOEA system 130 to mesh information, as collected by the MOEA system 130, when a re-optimization is initiated. In some example embodiments, the objective refinement system may even generate one or more initial chromosomes, using mesh chromosomes, as stored in a mesh archive from a previous generation, to population, at least in part, the archive checkpoint 302 prior to beginning a re-optimization. In some cases, generating the initial chromosomes may involve creating new chromosomes based upon one or more mesh chromosomes that may have defined peaks and/or valleys in a previous objective space. In some cases, creating new chromosomes may entail removing and/or adding decision variables that have changed in the chromosome data structure relative to the initial optimization. In some other cases, the initial chromosomes may be selected based at least in part on combinations (e.g., cross-over) between one or more mesh chromosomes.

In example embodiments, the processor(s) may further be configured to provide inputs as to directions in the chromosomes to explore based upon a difference between mesh chromosomes in an initial objective space and a corresponding chromosome in a new objective space. For example, if an analysis shows that a particular feature has shifted (e.g., shift in the objective space mapped to shifts in the decision variable space) in a new objective space relative to an old objective space by a certain amount, then it may be reasonable for the processor(s) 500 and/or the MOEA system 130 to shift one or more decision variables relative to another mesh chromosome by that certain amount to identify another feature in the new objective space. Thus, in this way, a delta analysis of the new objective space relative to the old objective space may be used to better predict a direction in which decision variables may be shifted to reach certain features in the new objective space.

It will be appreciated that there may be overlap in the functionality of the instructions stored in the one or more operating systems (O/S) module 512, the application(s) module 514, the refinement module 516, the mesh management module 518, the live data/IROP module 520, and the re-optimization module 522. In fact, the functions of the aforementioned modules 512, 514, 516, 518, 520, 522 may interact and cooperate seamlessly under the framework of the IROP system 150. Indeed, each of the functions described for any of the modules 512, 514, 516, 518, 520, 522 may be stored in any module 512, 514, 516, 518, 520, 522 in accordance with certain example embodiments of the disclosure. Further, in certain example embodiments, there may be one single module that includes the instructions, programs, and/or applications described within the operating systems (O/S) module 512, the application(s) module 414, the refinement module 516, the mesh management module 518, the live data/IROP module 520, and the re-optimization module 522.

Figure 6:
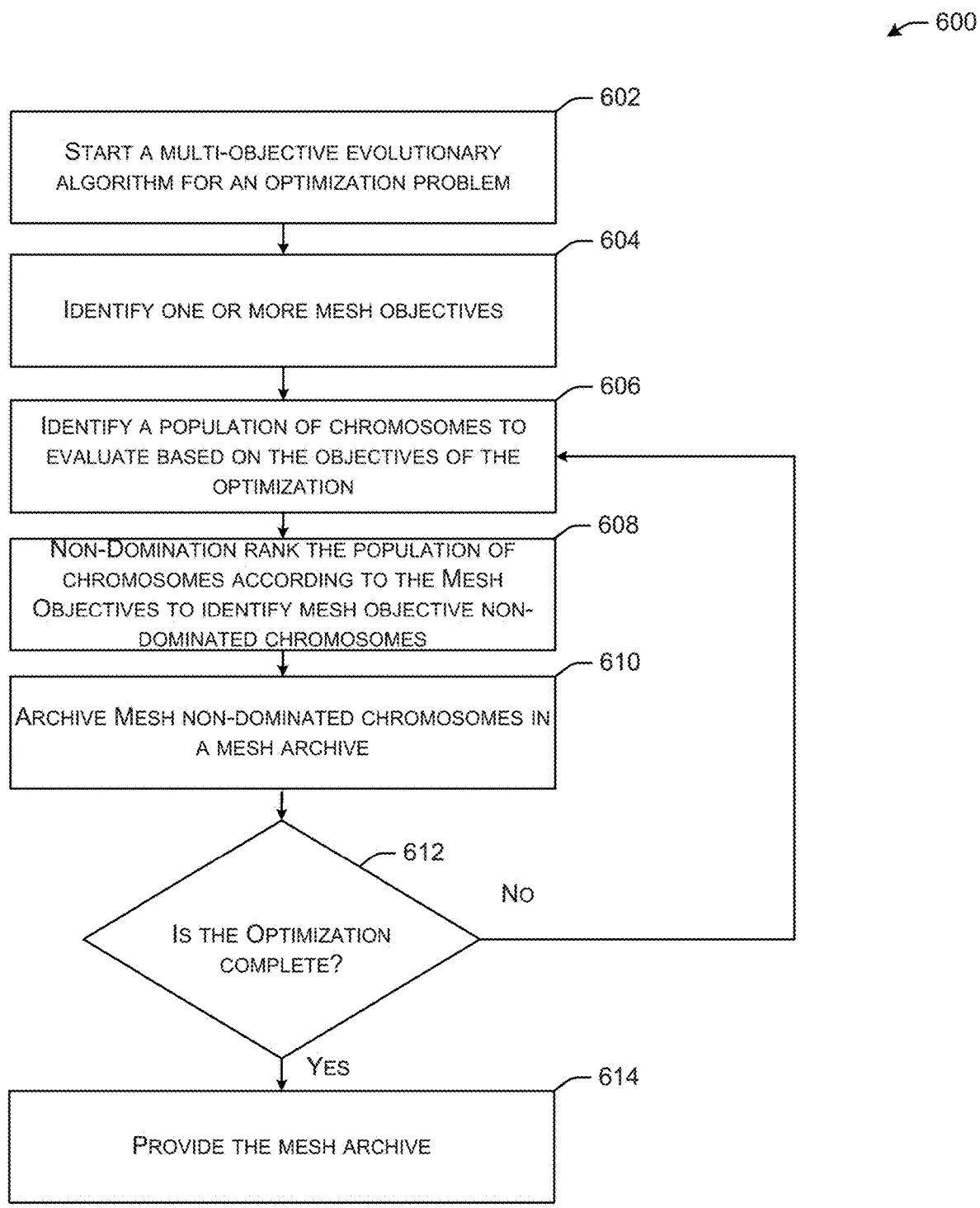
FIG. 6 is a flow diagram that illustrates an example method of generating an objective space mapping, in accordance with example embodiments of the disclosure.

FIG. 6 is a flow diagram that illustrates an example method 600 of generating an objective space mapping, in accordance with example embodiments of the disclosure. This method 600 may be implemented to provide a mapping of the objective space as a mesh of interesting features of the objective space in an initial optimization that may subsequently used for the purposes of re-optimization.

At block 602, a multi-objective evolutionary algorithm (MOEA) for an optimization problem may be started. This MOEA may be performed by the MOEA system 130, as described in FIG. 3. The functions of the MOEA may involve creating a population of solutions as chromosomes that are next ranked according to their performance (e.g., objective values). Elite chromosomes may be retained into further generations, where pairs of elite chromosomes may be selected for generating child populations of chromosomes that are again compared and ranked against the population of chromosomes according to their objective performance and whether they are viable (e.g., unconstrained). In this way, non-dominated chromosomes that perform better than other chromosomes may be filtered out as potential solutions to the optimization problem.

At block 604, one or more mesh objectives may be identified. The mesh objectives may include finding chromosomes with low absolute values of slopes with respect to one or more objectives. Low absolute values of slopes may indicate locations relatively close to local and/or global extrema (e.g., maxima and/or minima) and/or saddle points. In some other example embodiments, the mesh objectives may include searching for zero-crossings with respect to one or more objectives of chromosomes that may be relatively close to each other in the objective space and/or the decision variable space. It will be appreciated that the mesh objective(s) may be different from the objectives of the optimization problem. In particular, the mesh objectives may be criteria and/or metrics by which a chromosome in a relatively interesting part of the objective space may be identified. In example embodiments, this may entail looking for relatively low absolute value of slope. Such a slope measurement may be made by determining the differential between two or more closely spaced chromosomes and determining a slope with respect to one or more of the decision variables and/or combination of decision variable differentials (e.g., Euclidean decision variable distance between two chromosomes in relatively close proximity in the objective space). In some example embodiments, the mesh objectives may be used to identify various locations of relative interest, by identifying regions with relatively steep slopes. In some example embodiments, the mesh chromosomes that have already been identified from previous generations may be subjected to the mesh objective-based non-domination sorting, or otherwise mesh non-domination sorting, and selection. Additionally, in example embodiments, mesh objective epsilon space/box identification of non-dominated mesh chromosomes may be used. As a result, only one mesh chromosome may be selected from each mesh objective epsilon space. In this way, only a single mesh chromosome may be selected corresponding to each feature in the objective space.

In some example embodiments, the metrics used for ranking chromosomes for selection into a mesh may be based at least in part on calculations performed with one or more of the chromosomes in a particular neighborhood of the objective space. For example, there may be a plurality of chromosomes that may be ready of evaluation for whether they are to be stored as mesh chromosomes. From these plurality of chromosomes, a subset in a particular neighborhood, such as a region suspected to have boundaries of a feature (e.g., an extrema, saddle point, etc.) of interest in the objective space, may be identified. Thus, any mesh chromosomes related to a particular feature may be selected from within this neighborhood (e.g., predetermined region in the objective space). Next, a metric for comparing the chromosomes may be identified and determined for each chromosome of the subset of chromosomes. This metric may be a slope of a particular objective relative to a particular decision variable. For example, this slope may be calculated by identifying the chromosomes for which the slope is being calculated and its nearest neighbor in the objective space (e.g., such as by Euclidean distance, cosine distance, etc.). Next a difference in the particular objective value between the two chromosomes may be determined, as well as a difference in the value of the particular decision variable. The difference in the objective value may be divided by the difference in the decision variable value to identify, a slope. When all the slopes are calculated for each of the subset of chromosomes, the slopes may be ranked to identify which ones of the chromosomes may be within a predetermined threshold of a zero slope, and those chromosomes may be retained as mesh chromosomes. In other examples a predetermined number of the lowest absolute value of slope chromosomes may be identified as mesh chromosomes. It will be appreciated that the foregoing is only an example, and in other examples, any collection of metrics may be determined for the purposes of ranking the chromosomes. For example, slopes of multiple objective values may be determined for the chromosomes. As another example, slopes relative to multiple decision variables and/or collection of decision variables may be determined. As yet another example, slopes for a collection of objectives and/or a collection of decision variables may be determined and used for ranking the chromosomes for mesh chromosome identification. In still further examples, more than a single nearest neighbor chromosome may be used for the purposes of determining the slope for a particular chromosome. Still further examples, may include the use of calculated metrics other than slope for the purposes of ranking the chromosomes for mesh chromosome selection. It will also be appreciated that the neighborhood that is initially selected for culling the plurality of chromosomes into the subset of chromosomes may evolve over time. For example, if it is determined that the neighborhood is too small for the suspected size (e.g., in a hyper-dimensional sense) of a feature to be defined in the objective space, then the size of the neighborhood may be expanded to accommodate a collection of mesh chromosomes that may be boundary defining chromosomes of the feature that is too expansive for the initial definition of the neighborhood.

In some other example embodiments, a mechanism of rotating objective goals may be used for the purposes of mesh chromosome identification. In these example embodiments, if there are a collection of objectives for the optimization problem, each permutation for either maximizing and/or minimizing each of the objectives may be used to identify pareto-front chromosomes within a neighborhood in the objective space, such as a region of the objective space where a feature to be defined may exist. For example, if there are two objective functions, $f_1$ and $f_2$, then four pareto-fronts may be identified in a neighborhood (e.g., in a hyper-dimensional sense) of the objective space corresponding to (minimize $f_1$ and minimize $f_2$), (minimize $f_1$ and maximize $f_2$), (maximize $f_1$ and minimize $f_2$), and (maximize $f_1$ and maximize $f_2$). The chromosomes, or at least a subset of the chromosomes, of these four pareto-fronts may be designated mesh chromosomes.

At block 606, a population of chromosomes may be identified to evaluate based on the objectives of optimization. This population may be, for example, an initial population, such as found at block 304 in the MOEA system 130 of FIG. 3. The population of chromosomes may be those for which the objective values have already been determined and/or constraint violation checks have already been performed.

At block 608, a non-domination rank of the population of chromosomes may be performed according to the mesh objectives to identify mesh objective non-dominated mesh chromosomes. It should be noted that the population of chromosomes may be non-domination ranked based on the objectives of the optimization, but in the processes of block 608, the chromosomes may be ranked according to the mesh objective(s) identified during the processes of block 604. In some example embodiments, the mesh non-domination rank may involve epsilon-space techniques, where only one mesh chromosome may be selected from a particular region (e.g., hyperdimensional region) in the mesh objective space. In the same or other embodiments, the mesh non-domination sorting may include chromosomes from previous populations in the non-domination ranking. In some cases, this may involve reloading into memory (or leaving in memory) chromosomes that may have proven non-dominated from previous populations of chromosomes that were non-domination ranked.

At block 610, the mesh non-dominated chromosomes may be archived in a mesh archive. This may involve storing each of the mesh chromosomes in a mesh archive (e.g., mesh datastore and/or database). The mesh chromosomes may be stored along with their locations in the objective space (e.g., values of each of the objectives). At block 612, it may be determined if the optimization is complete. If it is determined that the optimization is not complete, then the method 600 may return to block 606 to identify a new population (e.g., potentially partially overlapping) of chromosomes from which identify mesh chromosomes to archive. If, however, at block 612 it is determined that the optimization is complete, then at block 614, the mesh archive may be provided. At his point the mesh archive may contain mesh chromosomes along with their respective locations in the objective space.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
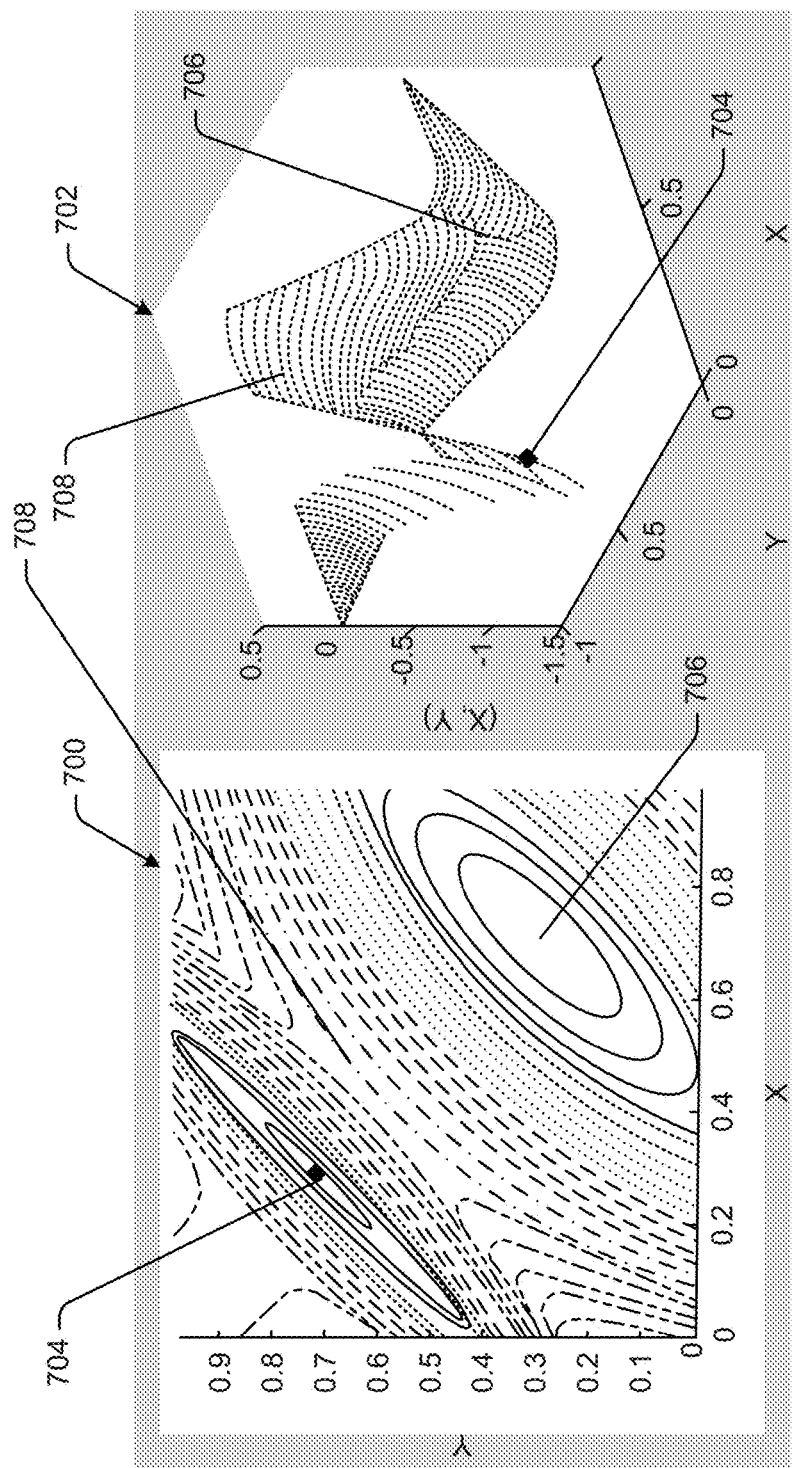
FIG. 7 is a schematic diagram that illustrates an example objective space with features that may be meshed for subsequent reference in a reformulated optimization, in accordance with example embodiments of the disclosure.

FIG. 7 is a schematic diagram that illustrates an example objective space 700, 702 with features 704, 706, 708 that may be meshed for subsequent reference in a reformulated optimization, in accordance with example embodiments of the disclosure. The objective space may be depicted in a two-dimensional projection of the objective space 700 or a three dimensional depiction of the objective space 702. It will be appreciated that a three dimensional objective space is depicted here for illustrative purposes. In an optimization problem, there may be any suitable dimensionality of the objective space, such as hyperdimensional spaces. Although the local minima 704, 706 may not be a global minima, and therefore, may be dominated out during the optimization, the chromosomes at 704, 706 may be interesting for the purposes of a reformulated optimization where local minima 704, 706 may become general locations of optimized solutions with a reduced number of objectives and/or decision variables. The region 708 may also be interesting from a meshing standpoint where the chromosome at 708 may represent a local maxima in the objective space 700, 702.

Figure 8:
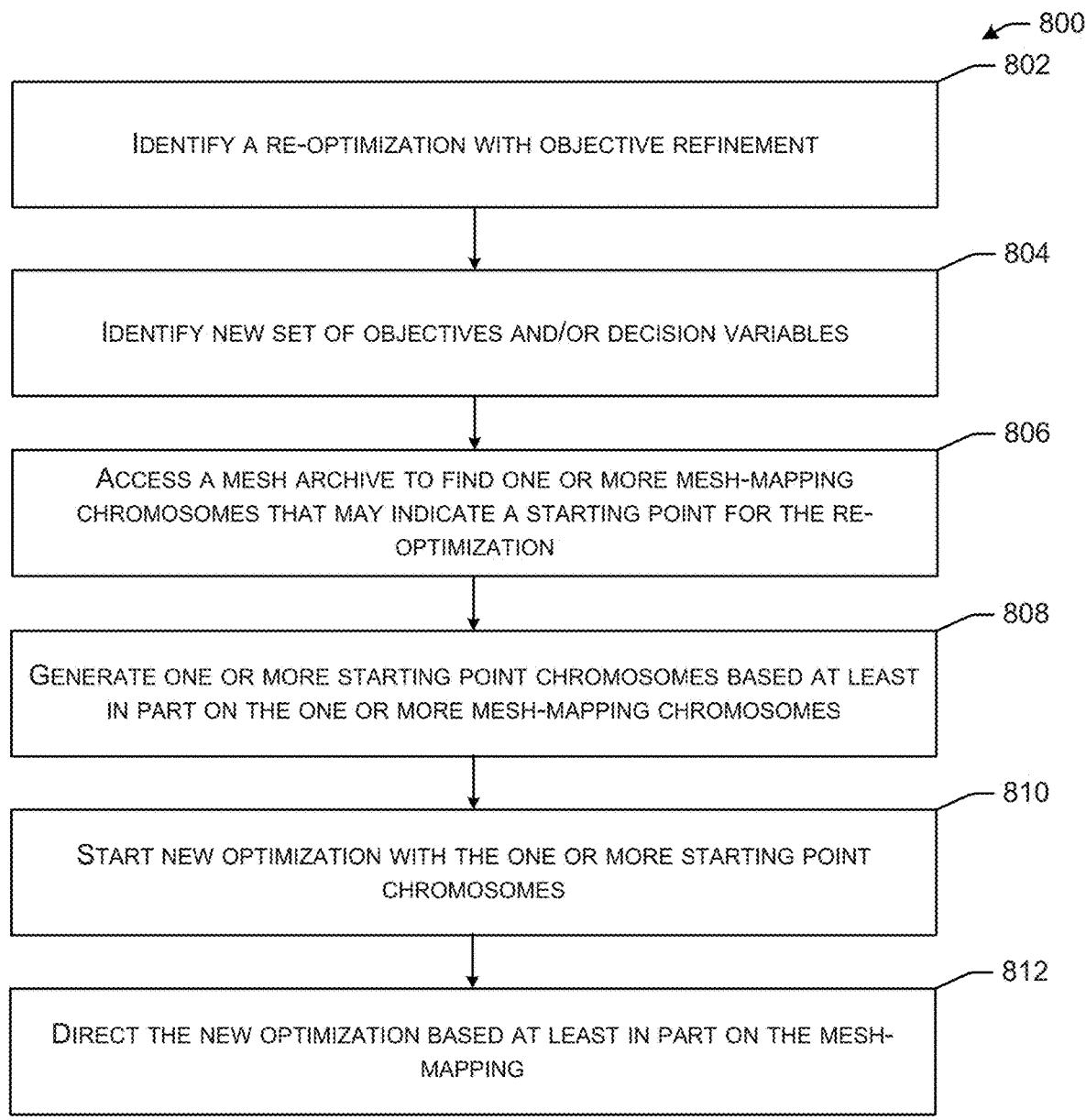
FIG. 8 is a flow diagram that illustrates an example method for directing a re-optimization based at least in part on a mesh-mapping of an objective space, in accordance with example embodiments of the disclosure.

FIG. 8 is a flow diagram that illustrates an example method 800 for directing a re-optimization based at least in part on a mesh-mapping of an objective space, in accordance with example embodiments of the disclosure. The method 800 may be performed by the MOEA system 130, and in example embodiments, the method 800 may be performed by the MOEA system 130 in conjunction with the objective refinement system 150.

At block 802, a re-optimization with objective refinement may be identified. At block 804, a new set of objectives and/or decision variables may be identified. The objective refinement may lead to changes in the objectives, by either adding, subtracting, and/or both adding some objectives and subtracting other objectives relative to an initial optimization. Additionally, the re-optimization may entail a different set of decision variables relative to the initial optimization.

At block 806, a mesh archive may be accessed to find one or more mesh-mapping chromosomes that may indicate a starting point for the re-optimization. In some cases, one or more of the mesh-mapping chromosomes may be identified as being in proximity of locations in the original objective space that may map to relatively good solutions in the new reformulated objective space. In some example embodiments, it may be useful to identify and retain pretty good solutions by this mechanism before searching for better solutions. Also, in example embodiments, by starting with a diverse set of relatively good chromosomes spread out across the objective space, a relatively greater amount of diversity of good chromosomes may result in a more rapid filtering of good genes and may relatively accelerate the progression to a global pareto-front in the reformulated re-optimization. In some example embodiments, where there may be a reprioritization of objectives, mesh chromosomes that performed well according to the reprioritized objectives in the initial prioritization, but not as well according to the objectives of that prioritization, may be particularly useful in the reformulated problem.

For a non-limiting example of identifying a relatively useful mesh chromosome, consider a first airline scheduling problem where financial metrics were prioritized for optimizing a route schedule. After a weather related irregular operation, stake holders (e.g., airline executives) may decide to prioritize customer satisfaction and delay minimization metrics relative to financial metrics. In the initial optimization, there may have been chromosomes that may have been stored in the mesh archive where the customer satisfaction and delay performances were particularly good, but the financial performances were not as good, and thus, that mesh chromosome may have been dominated out and was not presented on the pareto-front. However, in the new reformulated problem with a greater priority on customer satisfaction metrics and delay times, that particular mesh chromosome may be particularly useful and the genetic material of that mesh chromosome may be exploited, in accordance with the systems and methods disclosed herein, to more rapidly and/or with reduced resources, arrive at a solution to the reformulated optimization.

At block 808, one or more starting-point chromosomes based at least in part on the mesh-mapping chromosomes may be generated. One or more of the mesh chromosomes stored in the mesh archive, in some example embodiments, may be a starting point of the reformulated optimization. This may be the case, for example, if the decision variables of the reformulated optimization are the same as the original optimization. In other example embodiments, a starting point chromosome for the re-optimization may be determined based on one or more of the mesh chromosomes, as stored in the mesh archive. For example, a relatively interesting location of the objective space (e.g., a local minima or maxima) may be targeted. The mesh chromosome associated with this relatively interesting location may be identified in the mesh archive and then a transformation may be performed to convert the mesh chromosome in the initial decision variable space to a chromosome in the new decision variable space. In some cases, this transformation may entail removing and/or adding decision variables to those of the mesh chromosomes. For example, when some decision variables in a reformulated optimization problem are frozen out due to events that may have already transpired, those decision variables may be removed from the mesh chromosomes to generate the starting-point chromosome. In some further example embodiments, starting-point chromosomes may be generated based at least in part on combining (e.g., cross-over) of two or more mesh chromosomes and/or by modification (e.g., mutations) of one or more mesh chromosomes. In example embodiments, these functions may be performed before and/or after transformation of a mesh chromosome in the initial decision variable space to a reformulated chromosome in the reformulated decision variable space.

At block 810, a new optimization with the one or more starting point chromosomes may be started. Such an optimization may be similar to the initial optimization, but with the parameters of the reformulated problem (e.g., new decision variables, objectives, modifications in objective models, modifications in constraint models, or the like).

At block 812, the new optimization may be directed based at least in part on the mesh-mapping. In some cases, if a change in an objective value corresponding to a mesh chromosome in the initial objective space and a new transformed chromosome in the reformulated objective space is detected, then that difference may be exploited to predict the topology of the new reformulated objective space. For example, the change in the objective value may be used to predict how to change genes of a chromosome in the reformulated problem to achieve a more optimized solution.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
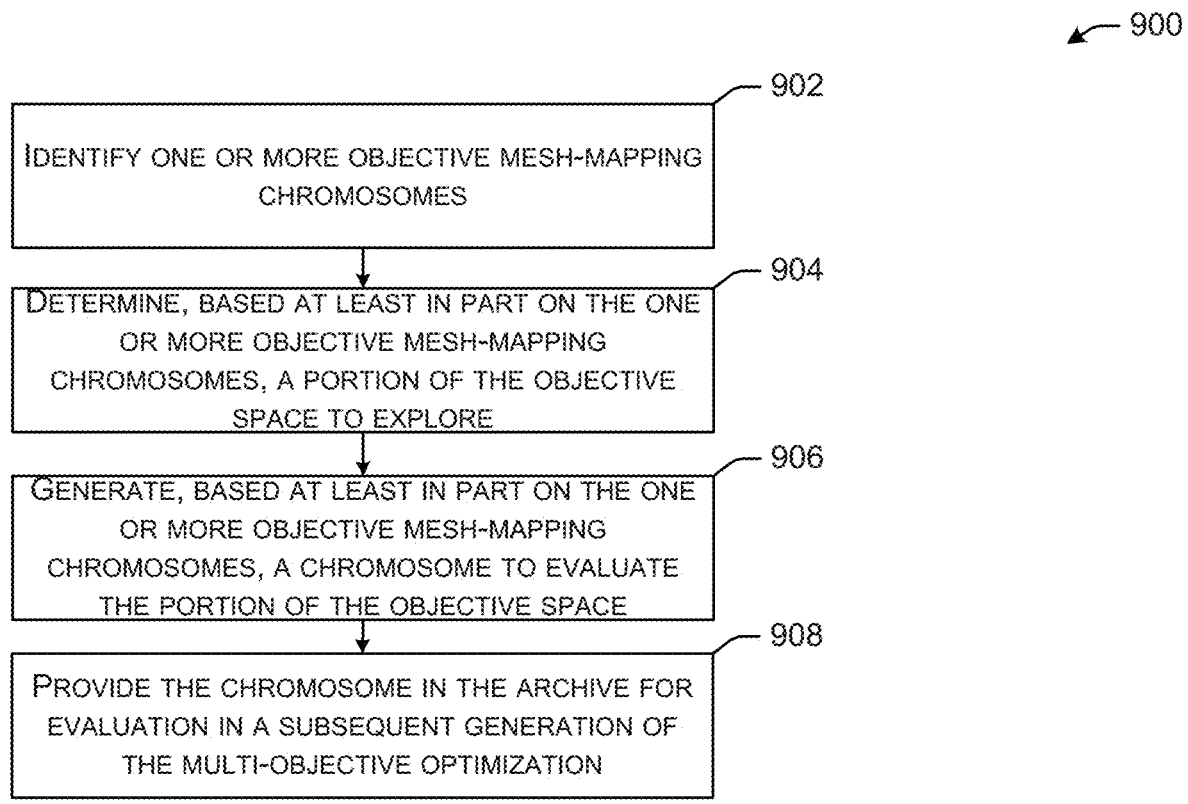
FIG. 9 is a flow diagram that illustrates an example method for driving to locations in an objective space to generate a mapping of the objective space, in accordance with example embodiments of the disclosure.

FIG. 9 is a flow diagram that illustrates an example method 900 for driving to locations in an objective space to generate a mapping of the objective space, in accordance with example embodiments of the disclosure. The method 900 may be performed by the MOEA system 130 individually, or in combination with one or more other entities, such as the objective refinement system 150.

At block 902, one or more objective space mesh-mapping chromosomes may be identified. These mesh chromosomes, in example embodiments, may have been selected from the current optimization problem. In some cases, these mesh chromosomes may have been selected as mesh chromosomes by being non-dominated according to one or more mesh objectives compared to other chromosomes that may be evaluated as part of the optimization problem. The mesh-chromosomes may represent portions of the objective space that may have features, such as extrema and/or saddle points.

At block 904, based at least in part on the one or more objective mesh-mapping chromosomes, a portion of the objective space to explore may be identified. In some example embodiments, this portion of the objective space may be identified as possibly providing and/or coming closer to providing a mesh-chromosome. In other example embodiments, portions of the objective space that may be sparsely explored and may provide useful features for the current optimization and/or for a future optimization may be targeted.

At block 906, based at least in part on the one or more objective mesh-mapping chromosomes, a chromosome to evaluate the portion of the objective space may be generated. In some cases, the identified portion of the objective space to be explored may be pursued by predicting the chromosome needed to evaluate that portion of the objective space. For example, if that portion of the objective space is close to another chromosome, then small changes in some of the genes relative to that proximal chromosome may be tried as a potential chromosome to explore the targeted portion of the objective space. In some example embodiments, if the portion of the objective space to be explored is bracketed by two previously explored chromosomes, then a combination (e.g., a linear interpolation, a quadratic interpolation, etc.) of genes of those two chromosomes may be used to generate a chromosome that may be at or close to the portion of the objective space to be explored. In some cases, interpolation of gene values may be used to attempt to explore the portion of the objective space, especially if that portion of the objective space is not fully bracketed by two or more chromosomes. At block 908, the generated chromosomes may be provided in the archive for evaluation in a subsequent generation of the multi-objective optimization. It will be appreciated that if the first round of guessing at the chromosome to achieve the portion of the objective space was not successful, then guessing at that chromosome to hit that portion of the objective space may be attempted again, and further using learning form the first attempt.

It should be noted that the method 900 may be modified in various ways in accordance with certain embodiments. For example, one or more operations of the method 900 may be eliminated or executed out of order in other embodiments. Additionally, other operations may be added to the method 900 in accordance with other embodiments.

It will be appreciated that the systems and methods, as disclosed herein, may enable the re-optimization of problems that were not solvable in a time constraint environment by previous systems and methods. Thus, by using previous optimization learning to form meshes that can then be used in subsequent re-optimization problems may enable improvements in the field of multi-objective optimization and multi-parallel computing and/or super-computing that were not previously available. Additionally, it will be appreciated that the systems and methods, as discussed herein, may reduce the level of needed resources (e.g., processing bandwidth, time, memory, etc.) for the purposes of performing multi-objective optimizations and re-optimizations. Therefore, a relatively greater scope and complexity of multi-objective optimization problems may be solvable by deploying the systems and methods as discussed herein.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:

identifying, by one or more processors of a multi-objective heuristic system, a plurality of chromosomes, wherein the plurality of chromosomes are associated with an optimization problem to optimize to a plurality of objectives;

identifying, by the one or more processors, one or more mesh objectives, the one or more mesh objectives associated with one or more features of an objective space of the optimization problem, wherein the one or more mesh objectives are different from the plurality of objectives;

ranking, by the one or more processors and according to the one or more mesh objectives, the plurality of chromosomes;

determining, by the one or more processors and based at least in part on the ranking, that a first chromosome among the plurality of chromosomes is mesh non-dominated according to the one or more mesh objectives, while the first chromosome is dominated according to the plurality of objectives;

providing, by the one or more processors, the first chromosome as a mesh chromosome, wherein the mesh chromosome identifies a particular feature in an objective space of the optimization problem different from an optimized solution to the optimization problem;

using the first chromosome as a starting point for a second optimization problem according to the plurality of objectives, wherein the first chromosome is used to generate a second chromosome; and providing the second chromosome as the optimized solution to the optimization problem.

2. The method of claim 1, further comprising:

identifying, by the one or more processors, the plurality of objectives;

ranking, by the one or more processors and according to the plurality of objectives, the plurality of chromosomes; and determining, by the one or more processors and based at least in part on the ranking, that a third chromosome among the plurality of chromosomes is non-dominated according to the plurality of objectives, wherein the first chromosome and the third chromosome are different chromosomes.

3. The method of claim 1, further comprising:

determining, by the one or more processors, a third chromosome based at least in part on the first chromosome, wherein the third chromosome comprises a potential mesh chromosome;

determining, by the one or more processors, one or more mesh objective values for the third chromosome;

identifying, by the one or more processors and based at least in part on a second ranking, that the third chromosome is mesh non-dominated; and providing, by the one or more processors, the third chromosome as a second mesh chromosome.

4. The method of claim 1, wherein the one or more mesh objective comprises a minimization of an absolute value of a slope of one of the objectives of the optimization problem.

5. The method of claim 1, wherein determining that the first chromosome among the plurality of chromosomes is mesh non-dominated according to the one or more mesh objectives comprises determining that the first chromosome outperforms the other of the plurality of chromosomes according to a value corresponding to the first chromosome and associated with the one or more mesh objectives.

6. The method of claim 1, wherein determining that the first chromosome among the plurality of chromosomes is mesh non-dominated according to the one or more mesh objectives comprises comparing a first value corresponding to the first chromosome and the one or more mesh objectives to a second value corresponding to a chromosome stored in a mesh archive.

7. The method of claim 1, wherein the first chromosome is at least one of: (i) at or about a local minima in an objective space of the optimization problem; (ii) at or about a local maxima in the objective space of the optimization problem; or (iii) at or about a saddle point in the objective space of the optimization problem, wherein the first chromosome defines a boundary of a feature in an objective space of the optimization problem.

8. The method of claim 1, optimization problem is a first optimization problem, and wherein the method further comprises:

determining, by the one or more processors, that the second optimization problem is to be performed; and generating, by the one or more processors and based at least in part on the first chromosome, a starting population of chromosomes for the second optimization problem, the starting population including the second chromosome.

9. The method of claim 8, wherein the second chromosome comprises a different set of decision variables relative to the first chromosome.

10. The method of claim 8, further comprising generating a third chromosome to be evaluated in the second optimization problem based at least in part on one or more chromosomes stored in a mesh archive.

11. A system, comprising:

a memory that stores computer-executable instructions;

at least one processor configured to access the memory, wherein the at least one processor is further configured to execute the computer-executable instructions to:

identify a plurality of chromosomes, wherein the plurality of chromosomes are associated with an optimization problem to optimize to a plurality of objectives;

identify one or more mesh objectives, the one or more mesh objectives associated with one or more features of an objective space of the optimization problem, wherein the one or more mesh objectives are different from the plurality of objectives;

rank, according to the one or more mesh objectives, the plurality of chromosomes;

determine, based at least in part on the ranking, that a first chromosome among the plurality of chromosomes is mesh non-dominated according to the one or more mesh objectives, while the first chromosome is dominated according to the plurality of objectives;

provide the first chromosome as a mesh chromosome, wherein the mesh chromosome identifies a particular feature in an objective space of the optimization problem different from an optimized solution to the optimization problem;

use the first chromosome as a starting point for a second optimization problem according to the plurality of objectives, wherein the first chromosome is used to generate a second chromosome; and provide the second chromosome as the optimized solution to the optimization problem.

12. The system of claim 11, wherein the at least one processor is further configured to execute the computer-executable instructions to:

identify the plurality of objectives;

rank, according to the plurality of objectives, the plurality of chromosomes; and determine, based at least in part on the ranking, that a third chromosome among the plurality of chromosomes is non-dominated according to the plurality of objectives, wherein the first chromosome and the third chromosome are different chromosomes.

13. The system of claim 11, wherein the at least one processor is configured to:

determine a third chromosome based at least in part on the first chromosome, wherein the third chromosome comprises a potential mesh chromosome;

determine one or more mesh objective values for the third chromosome;

identify, based at least in part on a second ranking, that the third chromosome is mesh non-dominated; and provide the third chromosome as a second mesh chromosome.

14. The system of claim 11, wherein the one or more mesh objective comprises a minimization of an absolute value of a slope of one of the objectives of the optimization problem.

15. The system of claim 11, wherein the at least one processor is configured to determine that the first chromosome among the plurality of chromosomes is mesh non-dominated according to the one or more mesh objectives further comprises the at least one processor is configured to execute the computer-executable instructions to determine that the first chromosome outperforms the other of the plurality of chromosomes according to a value corresponding to the first chromosome and associated with the one or more mesh objectives.

16. The system of claim 11, wherein the at least one processor is configured to determine that the first chromosome among the plurality of chromosomes is mesh non-dominated according to the one or more mesh objectives further comprises the at least one processor is configured to execute the computer-executable instructions to compare a first value corresponding to the first chromosome and the one or more mesh objectives to a second value corresponding to a chromosome stored in a mesh archive.

17. The system of claim 11, wherein the first chromosome is at least one of: (i) at or about a local minima in an objective space of the optimization problem; (ii) at or about a local maxima in the objective space of the optimization problem; or (iii) at or about a saddle point in the objective space of the optimization problem, wherein the first chromosome defines a boundary of a feature in an objective space of the optimization problem.

18. The system of claim 11, wherein the at least one processor is configured to further execute the computer-executable instructions to:
 determine that the second optimization problem is to be performed; and
 generate, based at least in part on the first chromosome, a starting population of chromosomes for the second optimization problem, the starting population including the second chromosome.

19. The system of claim 18, wherein the second chromosome comprises a different set of decision variables relative to the first chromosome.

20. The system of claim 18, wherein the at least one processor is further configured to execute the computer-executable instructions to generate a third chromosome to be evaluated in the second optimization problem based at least in part on one or more chromosomes stored in a mesh archive.

* * * * *